(12) United States Patent
Kaneichi et al.

(10) Patent No.: US 11,027,698 B2
(45) Date of Patent: Jun. 8, 2021

(54) LOADING DETERMINATION SYSTEM, LOADING DETERMINATION METHOD AND AUTHENTICATION INFORMATION CONTROL SYSTEM

(71) Applicant: TOYOTA JIDOSHA KABUSHIKI KAISHA, Toyota (JP)

(72) Inventors: Daiki Kaneichi, Nisshin (JP); Kei Kanaoka, Nagoya (JP); Shun Maeda, Nisshin (JP); Yoshihiro Murozaki, Nisshin (JP); Hiroko Tsujimura, Nagoya (JP); Kuniaki Jinnai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/211,293

(22) Filed: Dec. 6, 2018

(65) Prior Publication Data

US 2019/0176754 A1 Jun. 13, 2019

(30) Foreign Application Priority Data

Dec. 13, 2017 (JP) .............................. JP2017-238783

(51) Int. Cl.
*B60R 25/24* (2013.01)
*G06Q 10/08* (2012.01)

(52) U.S. Cl.
CPC ............. *B60R 25/24* (2013.01); *G06Q 10/08* (2013.01); *B60R 2325/108* (2013.01); *B60R 2325/205* (2013.01)

(58) Field of Classification Search
None
See application file for complete search history.

(56) References Cited

U.S. PATENT DOCUMENTS

| 10,300,832 | B1* | 5/2019 | Folks ...................... B60P 3/423 |
| 2015/0094876 | A1* | 4/2015 | Baldwin ................... B60R 5/00 |
| | | | 701/1 |
| 2017/0286907 | A1* | 10/2017 | Rizkallah ........... G06Q 30/0635 |
| 2017/0313421 | A1* | 11/2017 | Gil ............................ B65G 1/06 |

FOREIGN PATENT DOCUMENTS

JP 2006-206225 8/2006

\* cited by examiner

*Primary Examiner* — Carlos Garcia
(74) *Attorney, Agent, or Firm* — Oblon, McClelland, Maier & Neustadt, L.L.P.

(57) ABSTRACT

A loading determination system includes: a storage unit configured to store dimension information for each of a plurality of loading regions which is present in a vehicle, the dimension information being relevant to an upper limit of a dimension of a parcel which is able to be loaded in each of the loading regions; and a control unit configured to determine, based on the dimension information, whether a first parcel which is planned to be loaded is able to be loaded in the vehicle and output a determination result of whether the first parcel is able to be loaded, and first information relevant to a first loading region in which the first parcel is planned to be loaded when the first parcel is able to be loaded, the first loading region being included in the plurality of loading regions.

15 Claims, 15 Drawing Sheets

FIG. 3

| REQUEST USER ID | PARCEL ID | PICKUP-DELIVERY TYPE | PICKUP-DELIVERY DATE AND TIME | PICKUP-DELIVERY PLACE | PICKUP-DELIVERY STATUS |
|---|---|---|---|---|---|
| S001 | B001 | DELIVERY | 2017/11/01 12:00 - 15:00 | VEHICLE | COMPLETED |
| S001 | B002 | PICKUP | 2017/11/02 18:00 - 20:00 | VEHICLE | COMPLETED |
| S001 | B003 | DELIVERY | 2017/11/03 9:00 - 12:00 | VEHICLE | NOT COMPLETED |

| PICKUP-DELIVERY USER ID | PARCEL SIZE | PARCEL WEIGHT | UPTURNING PROHIBITION | LOWER-LOADING PROHIBITION | PICKUP-DELIVERY POSITION | LAYOUT CHANGE |
|---|---|---|---|---|---|---|
| ... | ... | ... | ... | ... | ... | POSSIBLE |
| ... | ... | ... | ... | ... | ... | POSSIBLE |
| ... | ... | ... | ... | ... | ... | POSSIBLE |

FIG. 4

| REQUEST USER ID | VEHICLE ID | VEHICLE MODEL | COLOR | LICENSE NUMBER | VEHICLE POSITION |
|---|---|---|---|---|---|
| S001 | ... | ... | WHITE | XXYY | ... |

FIG. 5

| REQUEST USER ID | VEHICLE ID | REGION | DIMENSION | CHILD SEAT | LOADING-ALLOWING DIMENSION | LOADING PARCEL ID | LOADING PARCEL ID |
|---|---|---|---|---|---|---|---|
| S001 | C001 | ASSISTANT DRIVER'S SEAT | ⋮ | NOT EQUIPPED | ⋮ | ⋮ | ⋮ |
| S001 | C001 | REAR SEAT | ⋮ | EQUIPPED | ⋮ | ⋮ | ⋮ |
| S001 | C001 | REAR LEFT SEAT | ⋮ | EQUIPPED | ⋮ | ⋮ | ⋮ |
| S001 | C001 | REAR RIGHT SEAT | ⋮ | NOT EQUIPPED | ⋮ | ⋮ | ⋮ |
| S001 | C001 | ASSISTANT DRIVER'S SEAT + REAR LEFT SEAT | ⋮ | EQUIPPED | ⋮ | ⋮ | ⋮ |
| S001 | C001 | TRUNK (WHOLE) | ⋮ | NOT EQUIPPED | ⋮ | ⋮ | ⋮ |
| S001 | C001 | TRUNK FRONT HALF | ⋮ | NOT EQUIPPED | ⋮ | ⋮ | ⋮ |
| S001 | C001 | TRUNK REAR HALF | ⋮ | NOT EQUIPPED | ⋮ | ▓ | ⋮ |
| S001 | C001 | TRUNK RIGHT FRONT + RIGHT REAR | ⋮ | NOT EQUIPPED | ⋮ | ⋮ | ⋮ |
| S001 | C001 | TRUNK MIDDLE FRONT + MIDDLE REAR | ⋮ | NOT EQUIPPED | ⋮ | ▓ | ⋮ |
| S001 | C001 | TRUNK LEFT FRONT + LEFT REAR | ⋮ | NOT EQUIPPED | ⋮ | ⋮ | ⋮ |
| S001 | C001 | TRUNK RIGHT FRONT | ⋮ | NOT EQUIPPED | ⋮ | ⋮ | ⋮ |
| S001 | C001 | TRUNK MIDDLE FRONT | ⋮ | NOT EQUIPPED | ⋮ | ⋮ | ⋮ |
| S001 | C001 | TRUNK LEFT FRONT | ⋮ | NOT EQUIPPED | ⋮ | ⋮ | ⋮ |

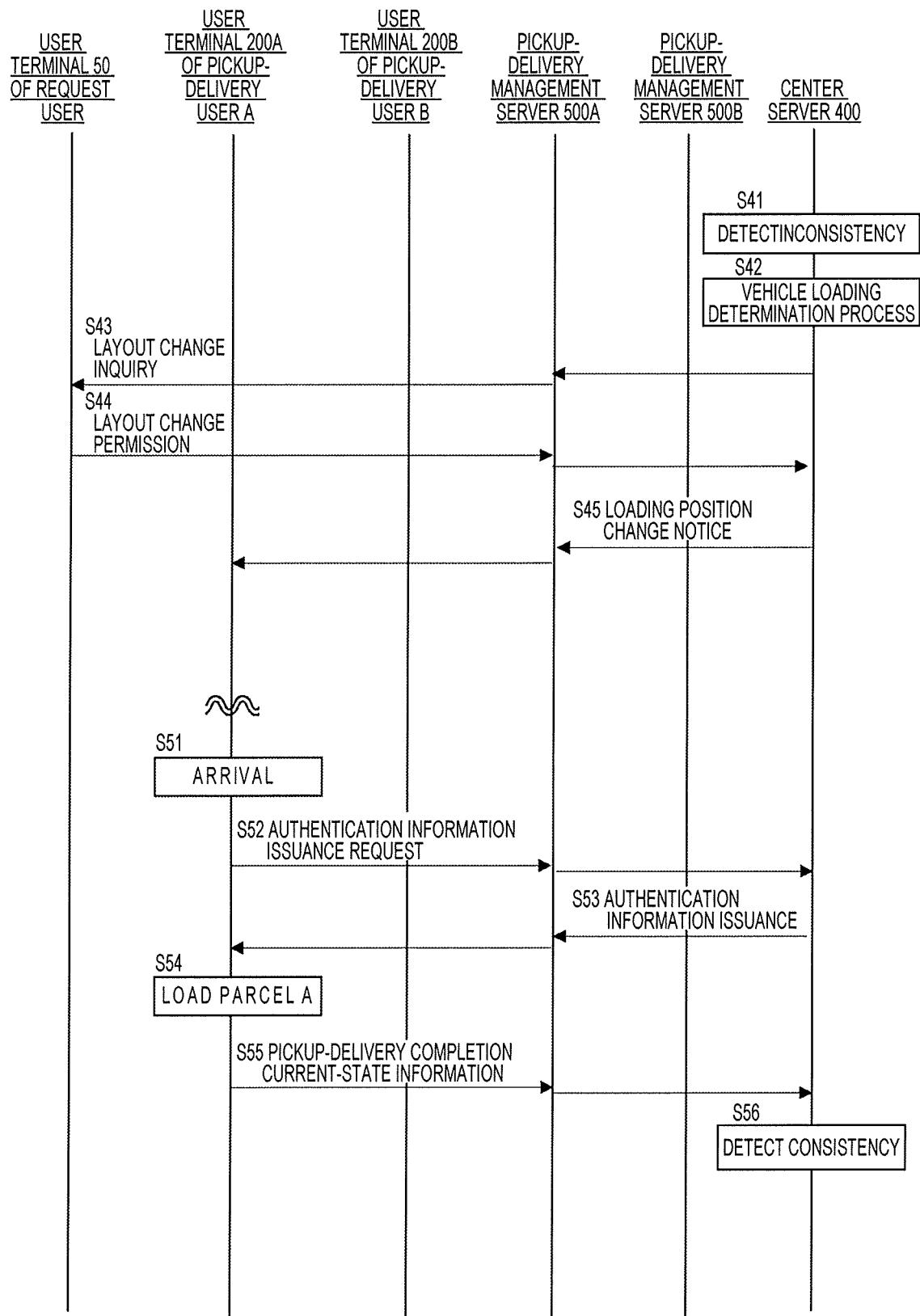

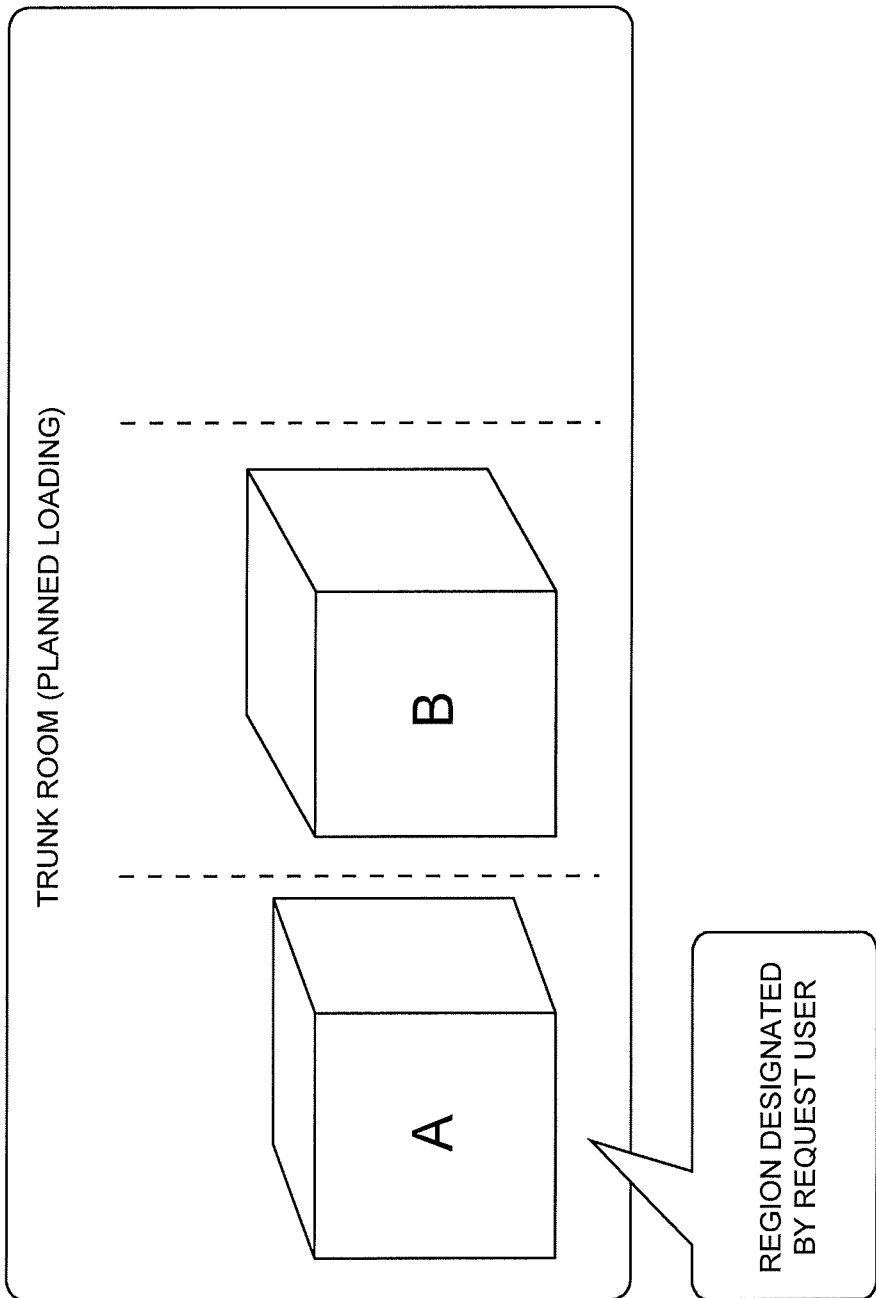

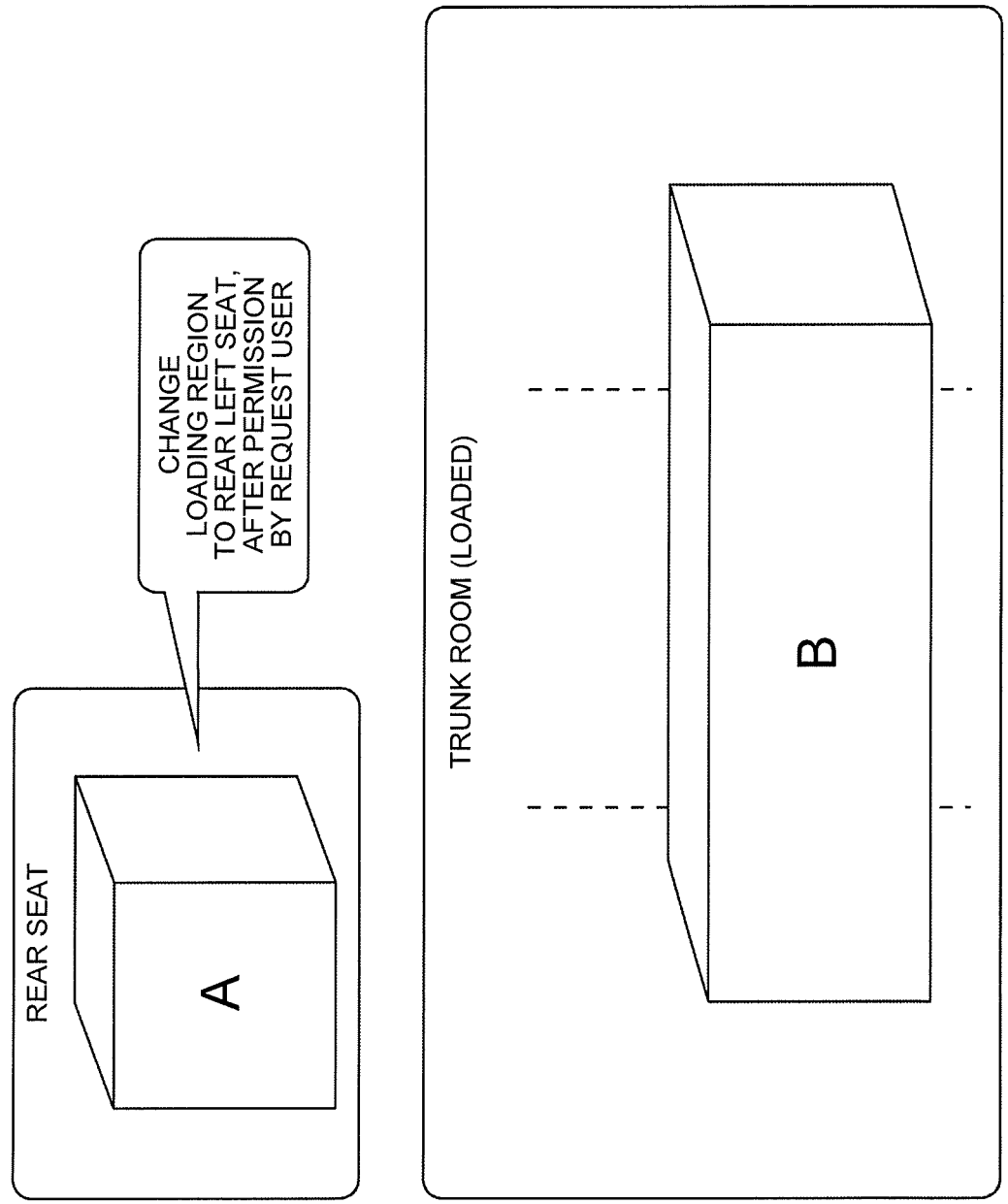

LOADING DETERMINATION SYSTEM, LOADING DETERMINATION METHOD AND AUTHENTICATION INFORMATION CONTROL SYSTEM

INCORPORATION BY REFERENCE

The disclosure of Japanese Patent Application No. 2017-238783 filed on Dec. 13, 2017 including the specification, drawings and abstract is incorporated herein by reference in its entirety.

BACKGROUND

1. Technical Field

The disclosure relates to a loading determination system, a loading determination method and an authentication information control system.

2. Description of Related Art

In recent years, as means for efficiently performing acceptance of a pickup-delivery article (parcel) between a user of a pickup-delivery service and a delivery business operator that performs pickup and delivery, there has been developed a trunk sharing system that uses a vehicle cabin or a luggage compartment of a vehicle such as a passenger car designated by the user, as an acceptance place for the pickup-delivery article. For example, Japanese Patent Application Publication No. 2006-206225 proposes a system that performs an authentication process between a pickup-delivery communication device of the delivery business operator and a vehicle communication device mounted on the designated vehicle at the time of the pickup and delivery of the pickup-delivery article and allows the designated vehicle to be locked and unlocked when the authentication succeeds.

SUMMARY

In systems that performs the pickup and delivery of the parcel using the vehicle, as exemplified by the above trunk sharing system, the delivery business operator cannot dispose the parcel as the pickup-delivery object in the vehicle, when the delivery business operator loads the parcel in the vehicle after arriving at the place, in some cases. Examples of the cases include a case where there is no space in the vehicle because other parcels have been already loaded and a case where a dimension of the parcel as the pickup-delivery object is large.

The disclosure provides a technology that can contribute to improvement of efficiency of loading work of the parcel in the vehicle.

A loading determination system according to a first aspect of the disclosure includes: a storage unit configured to store dimension information for each of a plurality of loading regions which is present in a vehicle, the dimension information being relevant to an upper limit of a dimension of a parcel which is able to be loaded in each of the loading regions; and a control unit configured to determine, based on the dimension information, whether a first parcel which is planned to be loaded is able to be loaded in the vehicle and output a determination result of whether the first parcel is able to be loaded, and first information relevant to a first loading region in which the first parcel is planned to be loaded when the first parcel is able to be loaded, the first loading region being included in the plurality of loading regions.

Examples of the vehicle include a passenger car, a truck and a van. Examples of the loading region include a region on each seat in a vehicle cabin of the vehicle and a region in a luggage compartment of the vehicle. Examples of the first loading region in which the parcel is planned to be loaded include a loading region that is designated as a loading position by a user who requests loading, and a loading region for which it is determined that the parcel as the object is able to be loaded. According to the above aspect, it is possible to obtain information of whether the parcel as the loading object is able to be loaded in the vehicle and information of the loading region in which the parcel is planned to be loaded, without going to a place where the vehicle is, and it is possible to improve efficiency of loading work.

In the above aspect, the upper limit of the dimension of a parcel which is able to be loaded in the first loading region may be larger than a dimension of the first parcel.

In the above aspect, the control unit may be configured to: determine, when another parcel has been loaded in the first loading region, whether a second loading region in which the other parcel is able to be loaded is present, the second loading region being included in the plurality of loading regions; and output second information relevant to the second loading region, when the control unit determines that the second loading region is present.

In the above aspect, the upper limit of the dimension of a parcel which is able to be loaded in the second loading region may be larger than a dimension of the other parcel, no parcel different from the other parcel may have been loaded in the second loading region, and the second loading region may be different from the first loading region.

In the above aspect, the second information may be a notice that prompts movement of the other parcel to the second loading region.

In the above aspect, the control unit may be configured to determine whether the other parcel has been loaded in the first loading region; and the first information may include information indicating whether the other parcel has been loaded in the first loading region.

According to the above aspect, by the notice, it is possible to obtain information of whether the movement of the other parcel is necessary for the loading of the first parcel, without going to a place where the vehicle is, and it is possible to improve the efficiency of the loading work.

In the above aspect, the control unit may be configured to: determine, when a first user who requests loading designates a loading region for the first parcel, whether the first parcel is able to be loaded in a designated loading region; and give a notice of a determination result of whether the first parcel is able to be loaded in the designated loading region, to a user terminal of the first user.

Examples of the first user who requests the loading is a possessor of the vehicle and a person who has the right to touch an article in the vehicle. According to the above aspect, for example, when the parcel is not able to be loaded, it is possible to prompt the user who requests the loading, to change the designation of the loading region of the parcel as the object or to change the disposition of articles in the vehicle such that the parcel as the object is able to be loaded.

In the above aspect, the control unit may be configured to: determine whether another loading region in which the first parcel is able to be loaded is present, when the first parcel is not able to be loaded in the designated loading region; and transmit a notice to the user terminal of the first user, the notice prompting change of the loading region for the first parcel to the other loading region, when the other loading region is present.

Thereby, it is possible to propose the change in the designation of the loading region for the parcel and a candidate of the loading region in which the parcel is able to be loaded, to the user who requests the loading, and it is possible to assist the user who requests the loading, to decide the loading region for the parcel.

In the above aspect, the control unit may be configured to: transmit a request to a user terminal of a first user who requests loading, when the first user is different from a second user who performs loading and the second loading region is present, the request requesting permission of movement of the other parcel to the second loading region; and transmit a notice to a user terminal of the second user when a permission response to the request is received from the user terminal of the first user, the notice being a notice that prompts movement of the other parcel to the second loading region.

Examples of the second user who performs the loading work include a person who has no authority to touch the article in the vehicle, as exemplified by a deliverer of a delivery business operator and a trading partner of a consumer-to-consumer trade. According to the above aspect, for example, even when the loading worker has no authority to touch the article in the vehicle, the loading worker can move the article in the vehicle for loading the parcel, leading to the improvement in the efficiency of the loading work.

In the above aspect, the loading determination system may further include a management unit configured to: update a value of the upper limit of the dimension included in the dimension information of the first loading region, to a value resulting from subtracting at least a value of the dimension of the first parcel from a stored value, after it is determined that the first parcel has been loaded in the first loading region, when lower loading of the first parcel is not prohibited; and set the dimension information of the first loading region to a value indicating that another parcel is not able to be loaded in the first loading region, when the lower loading of the first parcel is prohibited.

The lower loading means that the other parcel is loaded while the parcel is placed on the lower side, that is, that the other parcel is loaded on the parcel. According to the above aspect, in the loading region in which the parcel for which the prohibition of the lower loading is designated has been loaded, it is possible to avoid the other parcel from being loading after that loading, and it is possible to meet the demand about the loading of the parcel from the user who requests the loading.

In the above aspect, the control unit may be configured to determine whether a loading region in which a second parcel different from the first parcel is able to be loaded is present when the first parcel has been loaded in a third loading region, the first parcel being planned to loaded in the first loading region, the third loading region being a region in which the second parcel is planned to be loaded.

For example, even when the parcel is loaded in the third loading region different from the first loading region in which the parcel is planned to be loaded, for example, due to a mistake by a person who performs the loading work, it is possible to change a loading region for a parcel that is planned to be thereafter loaded in the third loading region, to automatically respond flexibly depending on a situation, and to improve the efficiency of the loading work.

In the above aspect, the control unit may be configured to determine whether a loading region in which a third parcel different from the first parcel is able to be loaded is present other than the first loading region, when the first parcel and the third parcel are planned to be loaded in the first loading region, the first parcel is loaded earlier than the third parcel and lower loading of the first parcel is prohibited.

For example, when a parcel A for which the prohibition of the lower loading is not designated and a parcel B for which the prohibition of the lower loading is designated are planned to be loaded in a single loading region in this order, the loading region for the parcel A is automatically determined newly, even if the parcel B for which the prohibition of the lower loading is designated is loaded earlier due to change in the order of the loading. Thereby, it is possible to respond flexibly to the change in the loading plan, and it is possible to improve the efficiency of the loading work.

An authentication information control system according to a second aspect of the disclosure is a system that controls access of a user to a predetermined region in a vehicle by issuing predetermined authentication information to a user terminal of a user, the vehicle being a vehicle in which a parcel is disposed and that is able to be locked and unlocked through a locking-unlocking process by a locking-unlocking control device, the predetermined authentication information being information that causes the locking-unlocking control device to execute the locking-unlocking process. The authentication information control system includes: the loading determination system according the above aspect, and an issuance unit configured to issue authentication information that allows only a door corresponding to the first loading region to be locked and unlocked.

According to the above aspect, when the loading worker is a third party, it is possible to limit the region in the vehicle that the loading worker can access, to the first loading region in which the parcel is planned to be loaded, and it is possible to protect security.

The loading determination system and the authentication information control system in the disclosure may be constituted by a single or a plurality of processing devices such as computers. When the loading determination system and the authentication information control system are constituted by a plurality of processing devices, constituents of the loading determination system and the authentication information control system are provided in a distributed manner in the plurality of processing devices, and the processing devices realize processes of the loading determination system and the authentication information control system, in cooperation.

An aspect of the disclosure is a loading determination method may include: storing information of a dimension that allows loading, in a storage unit, for each of a plurality of loading regions that is contained in a vehicle; determining whether a parcel as a loading object is able to be loaded in the vehicle, based on the dimension information; and outputting a determination result of whether the parcel is able to be loaded and information about a first loading region in which the parcel is planned to be loaded when the parcel is able to be loaded in the vehicle. The technical idea disclosed for the above-described loading determination system and authentication information control system can be applied also to the loading determination method, as long as there is no technical discordance.

With the disclosure, it is possible to improve the efficiency of the loading work of the parcel in the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a diagram showing an exemplary table configuration of a pickup-delivery information table that is stored in the pickup-delivery management server;

FIG. 4 is a diagram showing an exemplary table configuration of vehicle management information that is stored in the pickup-delivery management server;

FIG. 5 is a diagram showing an exemplary table configuration of vehicle loading information that is stored in the center server;

FIG. 11B is a diagram showing an exemplary process sequence of the delivery of the parcel to the vehicle using the service with the trunk sharing system in the specific example;

FIG. 12 is a diagram showing an exemplary plan of loading positions of parcels in the specific example; and FIG. 13 is a diagram showing an exemplary loading state in a trunk room after loading of a parcel A and a parcel B is completed in the specific example.

DETAILED DESCRIPTION OF EMBODIMENTS

Hereinafter, specific embodiments of the disclosure will be described based on the drawings. It is not intended that the technical scope of the disclosure is limited only to configurations described in the following embodiments, unless otherwise mentioned.

First Embodiment

System Configuration

Figure 1:
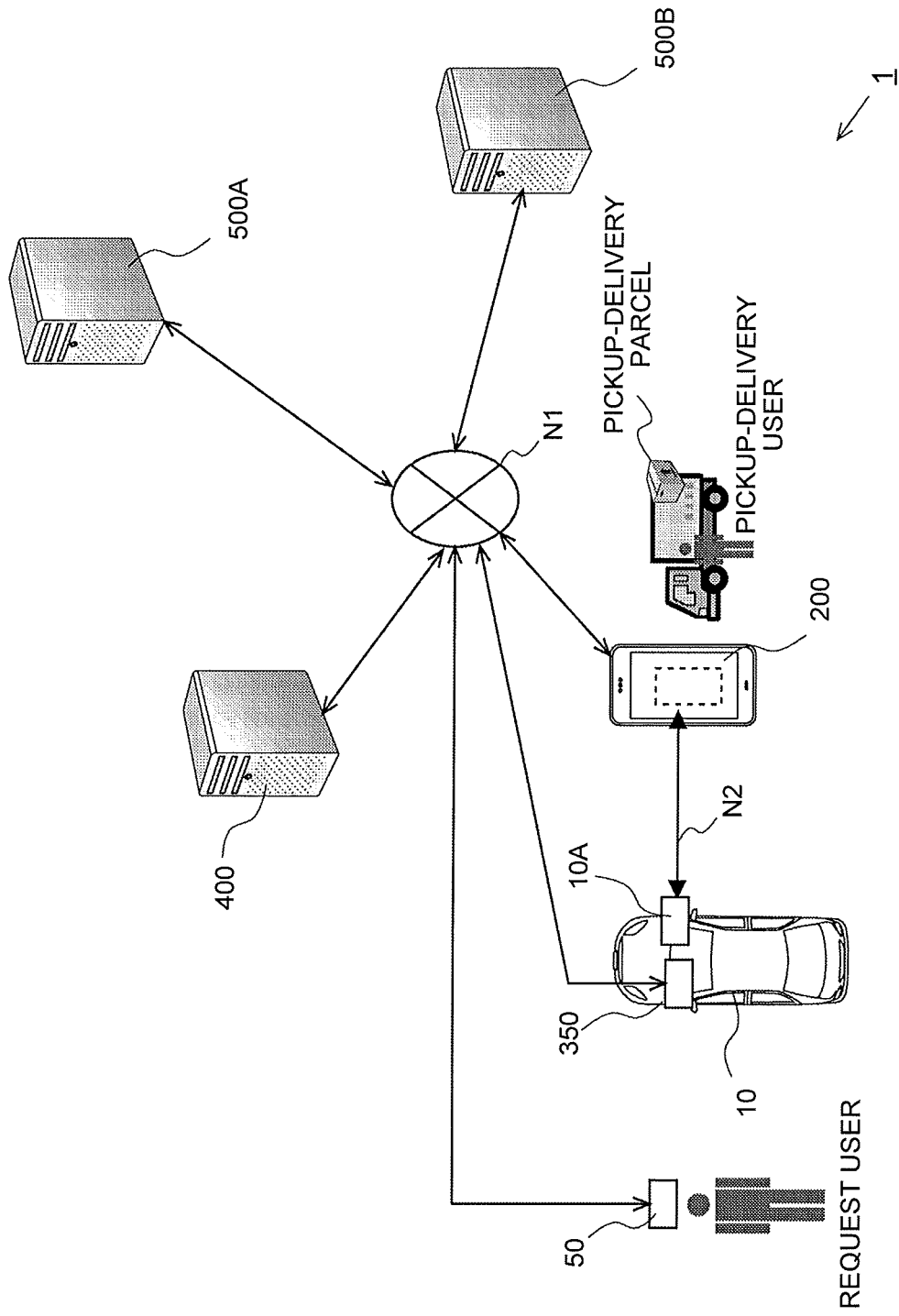
FIG. 1 is a diagram showing a schematic configuration of a trunk sharing system according to a first embodiment.

FIG. 1 is a diagram showing a schematic configuration of a trunk sharing system 1 according to a first embodiment. The trunk sharing system 1 is a system for realizing a pickup-delivery service that uses, as an acceptance place, a luggage compartment (trunk room) or a vehicle cabin of a vehicle 10 designated by a person who requests a pickup-delivery work for a pickup-delivery article (parcel), by sharing the luggage compartment or vehicle cabin between the requester and a person who performs the requested pickup-delivery work for the pickup-delivery article. Accordingly, the "person who requests a pickup-delivery work for a pickup-delivery article" and the "person who performs the pickup-delivery work for the pickup-delivery article" both are users that use the luggage compartment or vehicle cabin of the vehicle. To distinguish the two users, the former is referred to as a "request user", and the latter is referred to as a "pickup-delivery user". The luggage compartment or vehicle cabin is a predetermined region in the vehicle 10. The predetermine region, in which a parcel to be picked up and delivered can be disposed, is configured to be locked and unlocked by an in-vehicle device 10A described later. The luggage compartment is a region that is separated from the vehicle cabin where a driver and others of the vehicle 10 board such that mutual access is impossible.

In an example shown in FIG. 1, the trunk sharing system 1 includes the vehicle 10, a user terminal 200 of the request user, a user terminal 50 of the request user, a center server 400, and pickup-delivery management servers 500A, 500B. On the vehicle 10, the in-vehicle device 10A and a data communication device 350 are mounted. The data communication device 350, the user terminal 200, the user terminal 50, the center server 400 and the pickup-delivery management servers 500A, 500B are mutually connected through a network N1. For example, the network N1 is a worldwide public communication network such as the Internet, and a wide area network (WAN) or another communication network may be employed. The network N1 may include a telephone communication network such as a cellular phone network and a wireless communication network such as Wi-Fi.

For example, the vehicle 10 is a passenger car. The vehicle 10 may be a goods vehicle such as a lightweight truck and a van. For example, the request user is a person who has the authority to access the vehicle 10, as exemplified by a possessor of the vehicle 10 and a family member of the possessor of the vehicle 10.

The in-vehicle device 10A is connected to the user terminal 200 of the pickup-delivery user, through a network N2 including a short-range wireless communication. In the trunk sharing system 1, as an example, the two pickup-delivery management servers 500A, 500B are included, but three or more pickup-delivery management servers may be included. In the present specification, when the pickup-delivery management servers are collectively mentioned, reference numeral 500 is adopted.

For example, in the case of getting the pickup-delivery user to deliver an article purchased through a product purchase site set up by an e-commerce operator, the case of requesting a delivery business operator to perform the pickup-deliver of a parcel, or the case of getting a trading partner user in a consumer-to-consumer trade to perform the pickup-deliver of a parcel, the request user can register information relevant to the article as the pickup-delivery object, in the pickup-delivery management server 500, by an application installed in the user terminal 50 of the request user. The application is an application for using a service with the trunk sharing system 1. The pickup-delivery means pickup and/or delivery.

For example, before the loading work of the parcel in the vehicle 10, the request user can acquire information of whether the parcel can be loaded in the vehicle 10 and a loading position in the vehicle, by an application installed in the user terminal 50 of the request user. The application is an application for using a vehicle loading determination service that is provided by the center server 400. For example, the vehicle loading determination includes a determination of whether the parcel can be loaded in the vehicle 10, and a determination of the loading position of the parcel in the vehicle 10.

For example, the pickup-delivery management server 500 is a server that is managed by a delivery business operator, or a server that is managed by an operating company for a consumer-to-consumer (C-to-C) trade application. The pickup-delivery management server 500 accepts the registration of an article (hereinafter, also referred to as a "pickup-delivery parcel") that is a pickup-delivery object, for example, from the user terminal 50 of the request user or a management server for a production purchase site. As shown in FIG. 3 described later, the pickup-delivery information includes identification information of the request user, identification information of the pickup-delivery parcel, information of designation of pickup-delivery date and time, and the like. Further, the request user appropriately selects a pickup-delivery place to be used, from candidates of the pickup-delivery place, and the pickup-delivery information also includes the pickup-delivery place. For example, the candidates of the pickup-delivery place for the request user also include the vehicle 10. Hereinafter, descriptions will be made assuming that the pickup-delivery place for the request user is the vehicle 10. Furthermore, the pickup-delivery information also includes information relevant to a status of the pickup-delivery parcel. Examples of the status information include information of whether the pickup-delivery of the pickup-delivery parcel has been completed.

It is assumed that the pickup-delivery management server 500A and pickup-delivery management server 500B shown in FIG. 1 are managed by different business operators. Therefore, the pickup-delivery of the pickup-delivery parcel in accordance with the pickup-delivery information that is managed by the pickup-delivery management server 500A is performed by a business operator different from a business operator that performs the pickup-delivery of the pickup-delivery parcel in accordance with the pickup-delivery information that is managed by the pickup-delivery management server 500B. In the case of distinguishing pickup-delivery users who are requested to perform that pickup-deliver of pickup-delivery parcels from the business operators that manage the pickup-delivery management servers 500A, 500B, the pickup-delivery users will be hereinafter expressed as a pickup-delivery user A and a pickup-delivery user B, while reference characters are put.

The pickup-delivery management server 500 accepts the request of the pickup-delivery of the parcel, from the user terminal 50 of the request user, and when the pickup-delivery place is the vehicle 10, the pickup-delivery management server 500 requests the center server 400 to perform the vehicle loading determination for the parcel as the pickup-delivery object to the vehicle 10. For example, the pickup-delivery information may include the loading position of the parcel as the pickup-delivery object in the vehicle 10 determined by the center server 400.

The pickup-delivery management server 500 requests the center server 400 to issue authentication information for locking and unlocking the vehicle cabin or luggage compartment of the vehicle 10 in which the pickup-delivery parcel is loaded, to the user terminal 200 of the pickup-delivery user. For example, the request is performed in response to a request from the user terminal 200 of the pickup-delivery user.

For example, the center server 400 is a server that holds information relevant to a loading state of the parcel in a loading region of the vehicle 10 and the authentication information allowing the locking and unlocking of the vehicle 10. The loading region of the vehicle 10 is a region that is used for the loading of the parcel in the vehicle 10. In the vehicle 10, a plurality of loading regions is contained. Examples of the loading region include spaces on or under an assistant driver's seat and rear seats, and a space in a trunk room. Further, for example, the space in the trunk room may be separated into a plurality of spaces, and the space in the trunk room may contain a plurality of loading regions. When the space is separated, the space may be separated by a member such as a partition, or may be separated based on a positional relation such as a right side and a left side. The same goes for the spaces on or under the assistant driver's seat and rear seats. A business operator that manages the center server 400 may be different from the business operators that manage the pickup-delivery management servers 500, or may be the same as the business operator that manages one of the pickup-delivery management servers 500. In the first embodiment, it is assumed that the business operator that manages the center server 400 is different from the business operators that manage the pickup-delivery management servers 500.

For example, the center server 400 accepts the request of the vehicle loading determination from the user terminal 50 of the request user or the pickup-delivery management server 500, and performs a vehicle loading determination process. For example, the center server 400 stores information of dimensions allowing the parcel to be loaded for each of the plurality of loading regions in the vehicle 10, based on a capture image that is captured by a camera in the vehicle cabin or luggage compartment of the vehicle 10 and that is received from the data communication device 350 through the network N1, and information input from the request user through the user terminal 50. As the vehicle loading determination, the center server 400 determines whether the pickup-delivery parcel can be loaded in the vehicle 10 and the loading position of the pickup-delivery parcel in the vehicle 10, based on the information of dimensions allowing the loading in the loading regions of the vehicle 10 and information of dimensions of the pickup-delivery parcel, and gives a notice of the determination result to a request source, that is, to the user terminal 50 of the request user or the pickup-delivery management server 500. In the first embodiment, the center server 400 gives a notice of a loading region in which the parcel is planned to be loaded, as the loading position.

For example, the center server 400 accepts the request of the issuance of the authentication information from the user terminal 200 of the pickup-delivery user through the pickup-delivery management server 500, and performs an issuance control process for the authentication information. For example, the user terminal 200 of the pickup-delivery user transmits the request of the issuance of the authentication information, when detecting that the distance from the vehicle 10 is less than a predetermined distance. For example, whether the distance from the vehicle 10 is less than the predetermined distance may be detected based on positional information between the vehicle 10 and the user terminal 200 of the pickup-delivery user, or may be detected based on connection between the vehicle 10 and the user terminal 200 of the pickup-delivery user through the network N2 by a short-range wireless communication.

Based on the identification information of the request user associated with the identification information of the parcel received together with the issuance request for the authentication information, the center server 400 transmits the identification information of the vehicle 10 associated with the identification information of the request user, to the user terminal 200 of the pickup-delivery user through the pickup-delivery management server 500. The pickup-delivery user locks and unlocks the vehicle cabin or luggage compartment of the vehicle 10 using the authentication information acquired by the user terminal 200, and thereby, can access the vehicle cabin or luggage compartment of the vehicle 10 for delivering or picking up the pickup-delivery parcel.

The authentication information is digital information that causes the in-vehicle device 10A to execute a locking-unlocking process for the vehicle cabin or luggage compartment of the vehicle 10. The authentication information is transferred from the user terminal 200 to the in-vehicle device 10A by a short-range wireless communication, and is subjected to an authentication process by the in-vehicle device 10A. The locking-unlocking process for the vehicle cabin or luggage compartment of the vehicle 10 is a process of locking and unlocking a door of the vehicle cabin or luggage compartment of the vehicle 10 that contains the pickup-delivery parcel, with the in-vehicle device 10A described later in detail.

Figure 2:
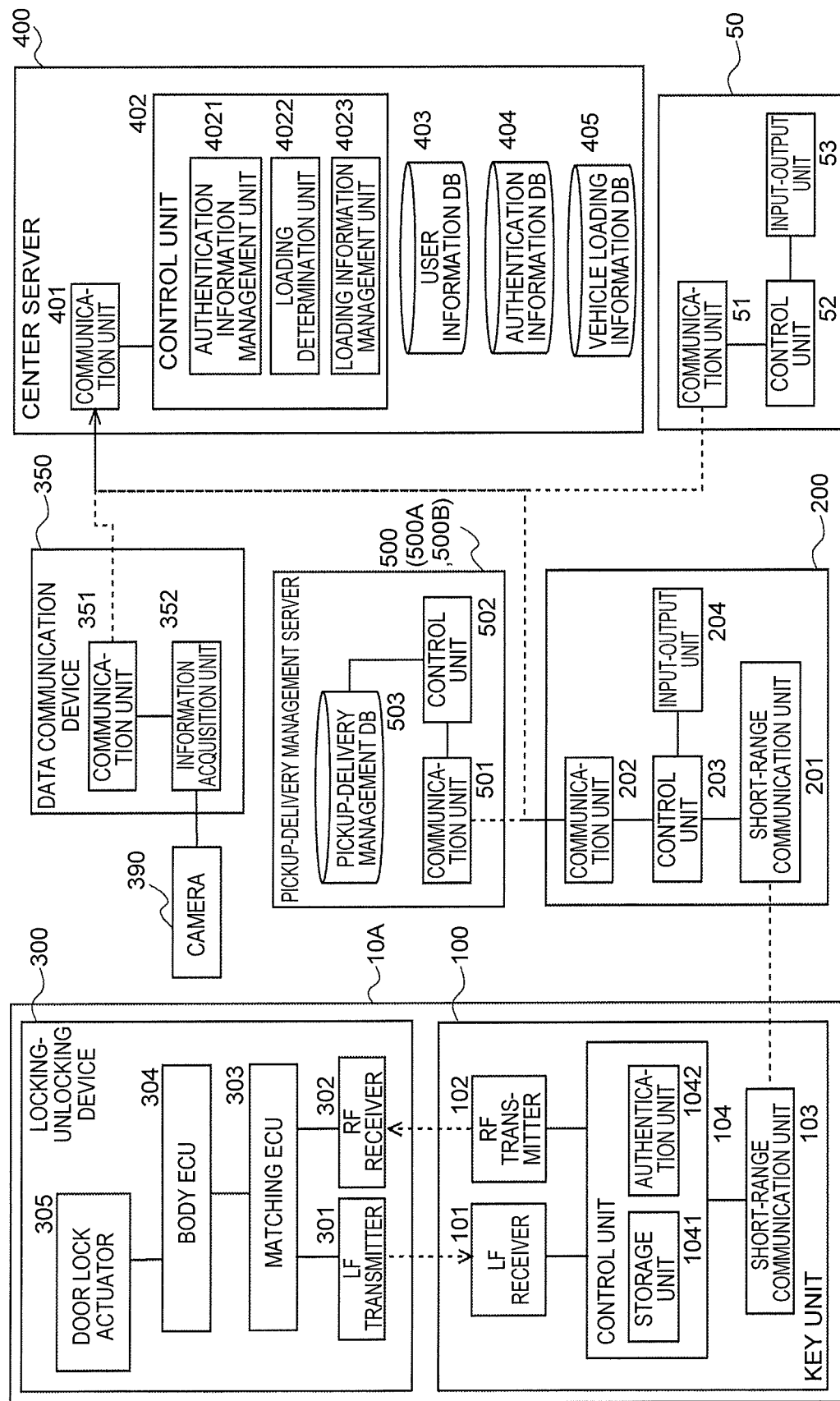
FIG. 2 is a diagram showing detailed configurations of an in-vehicle device, a data communication device, a user terminal, a center server and a pickup-delivery management server that constitute the trunk sharing system shown in FIG. 1.

FIG. 2 is a block diagram showing exemplary schematic configurations of the in-vehicle device 10A, the data communication device 350, the user terminal 200 of the pickup-delivery user, the user terminal 50 of the request user, the pickup-delivery management server 500 and the center server 400 that constitute the trunk sharing system 1. Based on FIG. 2, hardware configurations and functional configurations of the in-vehicle device 10A, the data communication device 350, the user terminal 200 of the pickup-delivery user, the user terminal 50 of the request user, the pickup-delivery management server 500 and the center server 400 will be described.

The in-vehicle device 10A includes a key unit 100 and a locking-unlocking device 300. The key unit 100 includes the same wireless interface as that of an electronic key (hereinafter, referred to as a portable device) of a smart key, and performs communication with the existing locking-unlocking device 300 of the in-vehicle device 10A. Thereby, it is possible to lock and unlock the luggage compartment or vehicle cabin of the vehicle 10, without using a physical key. Further, the key unit 100 performs the short-range wireless communication with the user terminal 200 of the pickup-delivery user, and determines whether to behave as the electronic key of the vehicle 10, based on the result of the authentication process for the user terminal 200 of the pickup-delivery user. Hereinafter, when it is not necessary to distinguish the luggage compartment and the vehicle cabin, the locking and unlocking of the luggage compartment or vehicle cabin of the vehicle 10 is also referred to as merely "locking and unlocking of the vehicle 10".

When the pickup-delivery user accesses the vehicle cabin or luggage compartment of the vehicle 10 for delivering and/or picking up the pickup-delivery parcel, the user terminal 200 of the pickup-delivery user requests the center server 400 to issue the authentication information for locking and unlocking the vehicle cabin or luggage compartment, through the pickup-delivery management server 500, as described above. The authentication information transmitted from the user terminal 200 of the pickup-delivery user to the key unit 100 is compared to authentication information previously stored in the key unit 100. When the authentication process by the key unit 100 succeeds, the user terminal 200 is authenticated as a terminal that rightfully actuates the in-vehicle device 10A.

When the user terminal 200 is authenticated, the key unit 100 transmits a key ID of the vehicle 10 that is previously stored in the key unit 100 and that is associated with the authentication information, to the locking-unlocking device 300, together with a locking-unlocking signal. When the key ID received from the key unit 100 coincides with a key ID previously stored in the locking-unlocking device 300, the locking-unlocking device 300 locks and unlocks the vehicle 10. The key unit 100 and the locking-unlocking device 300 operate with electric power that is supplied from a battery mounted on the vehicle 10. The key ID previously stored in the key unit 100 may be a key ID encrypted with the authentication information. In this case, when the authentication process of the user terminal 200 of the pickup-delivery user succeeds, the key unit 100 decrypts the key ID with the authentication information, and then transmits the key ID to the locking-unlocking device 300. The authentication information and the key ID may be different for each of the loading regions of the vehicle cabin and the luggage compartment. For example, the authentication information and the key ID may be different for each of a door of a driver's seat, a door of the assistant driver's seat, doors of the rear seats and a door of the trunk room.

Details of the locking-unlocking device 300 will be described. The locking-unlocking device 300 is a device for locking and unlocking the door of the vehicle cabin or luggage compartment of the vehicle 10. For example, the locking-unlocking device 300 locks and unlocks the door of the vehicle 10, in response to a locking signal and an unlocking signal that are transmitted from the portable device corresponding to the vehicle 10 with an electric wave in a radio frequency (hereinafter, referred to as RF) band. Further, the locking-unlocking device 300 has a function to transmit an electric wave in a low frequency (hereinafter, referred to as LF) band, for searching the portable device.

In the embodiment, instead of the portable device, the key unit 100 transmits and receives the electric waves in the RF band and LF band, for the locking-unlocking device 300, so that the locking and unlocking of the door of the vehicle 10 are controlled. Hereinafter, unless otherwise mentioned, descriptions will be made assuming that the communication destination of the locking-unlocking device 300 is the key unit 100.

The locking-unlocking device 300 is configured to include an LF transmitter 301, an RF receiver 302, a matching ECU 303, a body ECU 304, and a door lock actuator 305. The LF transmitter 301 is means for transmitting an electric wave in a low frequency band (for example, 100 KHz to 300 KHz) for searching (polling) the key unit 100. For example, the LF transmitter 301 is incorporated near a center console or steering wheel in the vehicle cabin. The RF receiver 302 is means for receiving an electric wave in a high frequency band (for example, 100 MHz to 1 GHz) transmitted from the key unit 100. The RF receiver 302 is incorporated at a place in the vehicle cabin.

The matching ECU 303 is a computer that performs a control to lock and unlock the door of the vehicle cabin or luggage compartment of the vehicle 10, based on the signal (the locking signal or the unlocking signal) transmitted from the key unit 100 with the electric wave in the RF band. For example, the matching ECU 303 is constituted by a microcomputer. In the following description, the locking signal and the unlocking signal will be collectively referred to as the locking-unlocking signal. The term "locking-unlocking signal" means at least either one of the locking signal and the unlocking signal.

The matching ECU 303 authenticates the locking-unlocking signal transmitted from the key unit 100, as a signal transmitted from a rightful device. Specifically, the matching ECU 303 determines whether a key ID included in the locking-unlocking signal coincides with a key ID previously stored in an unillustrated storage unit of the matching ECU 303. Then, based on the result of the determination, the matching ECU 303 transmits an unlocking command or a locking command to the body ECU 304. The unlocking command or the locking command is transmitted through an in-vehicle network such as a controller area network (CAN).

The door lock actuator 305 is an actuator that locks and unlocks the door of the vehicle 10. Examples of the door of the vehicle 10 include a vehicle cabin door that is opened or closed at the time of getting on or getting out of the vehicle cabin that is a riding space, and a luggage compartment door that is opened or closed at the time of loading or unloading the parcel in the luggage compartment. The door lock actuator 305 operates based on a signal transmitted from the body ECU 304. The door lock actuator 305 may be configured to lock and unlock the vehicle cabin door and luggage compartment door of the vehicle 10 independently.

The body ECU 304 is a computer that performs a body control for the vehicle 10. The body ECU 304 has a function to lock and unlock the vehicle cabin door and luggage compartment door of the vehicle 10 concurrently or independently, by controlling the door lock actuator 305 based on the unlocking command or locking command received from the matching ECU 303. The matching ECU 303 and the body ECU 304 may be integrated.

Next, the key unit 100 will be described. The key unit 100 is a device that is disposed at a predetermined position (for example, within a glove box) in the vehicle cabin of the vehicle 10. The key unit 100 has a function to authenticate the user terminal 200 while performing the short-range wireless communication with the user terminal 200 of the pickup-delivery user, and the like, and a function to transmit the locking-unlocking signal using an electric wave in an RF band, based on the authentication result. The key unit 100 is configured to include an LF receiver 101, an RF transmitter 102, a short-range communication unit 103, and a control unit 104.

The LF receiver 101 is means for receiving a polling signal transmitted from the locking-unlocking device 300 with an electric wave in an LF band. The LF receiver 101 includes an antenna (hereinafter, referred to as an LF antenna) for receiving the electric wave in the LF band. The RF transmitter 102 is means for transmitting the locking-unlocking signal to the locking-unlocking device 300 with an electric wave in an RF band.

The short-range communication unit 103 is means for performing communication with the user terminal 200 of the pickup-delivery user. The short-range communication unit 103 performs communication in a short range (a range allowing communication between the interior and exterior of the vehicle cabin), using a predetermined wireless communication standard. In the first embodiment, the short-range communication unit 103 performs data communication using the Bluetooth (R) Low Energy standard (hereinafter, referred to as BLE). BLE is a low-power communication standard of Bluetooth, and is characterized in that pairing between devices is not required and the communication can be started shortly after a partner is detected. Although BLE is used as an example in the embodiment, another wireless communication standard may be used. For example, Near Field Communication (NFC), Ultra Wideband (UWB), Wi-Fi (R), or the like may be used.

The control unit 104 is a computer that performs the short-range wireless communication with the user terminal 200 of the pickup-delivery user through the short-range communication unit 103 and that performs a control to authenticate the user terminal 200 and a control to transmit the locking-unlocking signal based on the authentication result. For example, the control unit 104 is constituted by a microcomputer.

The control unit 104 includes a storage unit 1041 and an authentication unit 1042. In the storage unit 1041, a control program for controlling the key unit 100 is stored. The control unit 104 may realize various functions including the authentication unit 1042, by executing the control program stored in the storage unit 1041 with an unillustrated central processing unit (CPU) included in the microcomputer constituting the control unit 104. For example, the control unit 104 realizes a function to receive the polling signal transmitted from the locking-unlocking device 300 as an electric wave in an LF band, through the LF receiver 101, a function to transmit the locking-unlocking signal as an electric wave in an RF band, to the locking-unlocking device 300 through the RF transmitter 102, a function to process the communication with the user terminal 200 of the pickup-delivery user that is performed through the short-range communication unit 103, a function to generate the locking-unlocking signal when the authentication of the user terminal 200 of the pickup-delivery user by the authentication unit 1042 succeeds, and the like.

The authentication unit 1042 authenticates the user terminal 200 based on the authentication information included in a locking request or unlocking request (hereinafter, collectively referred to as a locking-unlocking request) transmitted from the user terminal 200 of the pickup-delivery user. Specifically, the authentication unit 1042 compares the authentication information stored in the storage unit 1041 and the authentication information transmitted from the user terminal 200 of the pickup-delivery user, and determines that the authentication succeeds, when the two pieces of authentication information meet a predetermined relation. Further, the authentication unit 1042 determines that the authentication fails, when the two pieces of authentication information do not meet the predetermined relation. Examples of the predetermined relation include a case where the authentication information stored in the storage unit 1041 and the authentication information transmitted from the user terminal 200 of the pickup-delivery user coincide with each other, a case where the results of a predetermined encryption process, decryption process or the like using the two pieces of authentication information coincide with each other, and a case where the result of a decryption process for one of the two pieces of authentication information coincides with the result of the decryption process for the other of the two pieces of authentication information.

When the authentication of the user terminal 200 of the pickup-delivery user by the authentication unit 1042 succeeds, the locking-unlocking signal generated in response to the request received from the user terminal 200 is transmitted to the locking-unlocking device 300 through the RF transmitter 102. Hereinafter, as necessary for description, the authentication information stored in the key unit 100 is referred to as device authentication information, and the authentication information transmitted from the user terminal 200 of the pickup-delivery user is referred to as terminal authentication information.

The key unit 100 transmits the above key ID to the locking-unlocking device 300, together with the locking-unlocking signal. The key ID may be previously stored in the key unit 100 as a plain text, or may be stored while being encrypted by a code specific to the user terminal 200 of the pickup-delivery user. In the case where the key ID is stored while being encrypted, the encrypted key ID may be decrypted by the authentication information transmitted from the user terminal 200 of the pickup-delivery user, and the original key ID may be obtained.

Thus, in response to the authentication information transmitted from the user terminal 200, the in-vehicle device 10A actuates the locking-unlocking device 300 through the authentication process by the key unit 100, and executes a sequence of processes for locking and unlocking the vehicle cabin or luggage compartment of the vehicle 10. The sequence of processes is the locking-unlocking process by the in-vehicle device 10A, and corresponds to the locking-unlocking process by the locking-unlocking device of the disclosure.

Next, on the vehicle 10, a camera 390 and the data communication device 350 are mounted in addition to the in-vehicle device 10A. For example, a plurality of cameras 390 is mounted on the vehicle 10, and is provided in the vehicle cabin and the luggage compartment, respectively. The camera 390 and the data communication device 350 are connected, for example, by an in-vehicle network such as a CAN. For example, the capture range of the camera 390 is the interior of the vehicle cabin or the interior of the luggage compartment. The camera 390 captures an image with a predetermined period or in response to a request from the data communication device 350 or a request from the center server 400 through the data communication device 350, and transmits the capture image to the data communication device 350 or to the center server 400 through the data communication device 350.

The data communication device 350, which is a device mounted on the vehicle 10, is configured as a computer that has processors (not illustrated) including a CPU and a digital signal processor (DPS), a main storage unit (not illustrated) including a RAM and a read only memory (ROM), and an auxiliary storage unit (not illustrated) including an erasable programmable ROM (EPROM), a hard disk drive (HDD) and a removable medium.

For example, the removable medium is a universal serial bus (USB) memory, or a disc recording medium such as a compact disc (CD) and a digital versatile disc (DVD).

In the auxiliary storage unit, an operating system (OS), various programs, various tables and the like are stored, and the stored programs are loaded into a working area of the main storage unit and are executed. By the execution of the programs, constituent parts and the like are controlled, so that functions corresponding to predetermined purposes can be realized.

Furthermore, the data communication device 350 includes a communication unit 351. The communication unit 351 performs communication with the center server 400. For example, the communication unit 351 is a wireless communication circuit for wireless communication. The wireless communication circuit is connected to the network N1 such as the Internet that is a public communication network.

In the data communication device 350, the above-described processors execute a program, so that an information acquisition unit 352 is formed as a function unit. For example, the information acquisition unit 352 receives the capture image of the interior of the vehicle cabin or the interior of the luggage compartment from the camera 390 through a CAN or the like, and transmits the capture image of the interior of the vehicle cabin or the interior of the luggage compartment to the center server 400 through the communication unit 351.

Next, the user terminal 200 of the pickup-delivery user will be described. For example, the user terminal 200 is a small-size portable computer such as a smartphone, a cellular phone terminal, a tablet terminal, a personal information terminal and a wearable computer (a smartwatch and the like). The user terminal 200 may be a personal computer (PC) that is connected to the pickup-delivery management server 500 through the network N1 such as the Internet that is a public communication network. The user terminal 200 of the pickup-delivery user is configured to include a short-range communication unit 201, a communication unit 202, a control unit 203 and an input-output unit 204.

The short-range communication unit 201 is means for performing communication with the key unit 100 in the same communication standard as that of the short-range communication unit 103 of the key unit 100. The network that is formed between the short-range communication unit 201 and the key unit 100 is a network that is expressed as the network N2 in FIG. 1. The communication unit 202 is communication means for connecting the user terminal 200 to the network N1. In the first embodiment, the user terminal 200 can perform communication with another device (for example, the pickup-delivery management server 500) via the network N1, using a mobile communication service such as 3rd Generation (3G) and Long Term Evolution (LTE).

The control unit 203 is a computer that controls the user terminal 200. For example, the control unit 203 performs a process of acquiring the above-described terminal authentication information, a process of generating the locking-unlocking request including the acquired terminal authentication information, a process of transmitting the generated locking-unlocking request to the key unit 100, and the like. For example, the control unit 203 is constituted by a microcomputer. On the microcomputer, for example, storage means and processors are mounted. Programs stored in the storage means (a ROM and the like) mounted on the microcomputer are executed by the processors (a CPU and the like (not illustrated)) mounted on the microcomputer, so that functions for performing the above various processes are realized.

Further, the control unit 203 performs interaction with the pickup-delivery user through the input-output unit 204. The input-output unit 204 is means for accepting an input operation performed by the pickup-delivery user and presenting information to the pickup-delivery user. Specifically, the input-output unit 204 is constituted by a touch panel, control means for the touch panel, a liquid crystal display and control means for the liquid crystal display. In the first embodiment, the touch panel and the liquid crystal display are constituted by a single touch panel display.

The control unit 203 displays an operation screen on the input-output unit 204, and generates a locking-unlocking request corresponding to an operation performed by the pickup-delivery user. For example, the control unit 203 outputs an icon for unlocking, an icon for locking, and the like, on the touch panel display, and generates the unlocking request or the locking request based on the operation performed by the pickup-delivery user. The operation to be performed by the pickup-delivery user is not limited to the operation to be performed through the touch panel display. For example, the operation may be performed through a hardware switch or the like.

The control unit 203 performs the process of acquiring the terminal authentication information from the center server 400. The terminal authentication information is not information (key ID) for the authentication of the key unit 100 by the locking-unlocking device 300, but information for the authentication of the user terminal 200 by the key unit 100. For example, the information for the authentication of the user terminal 200 by the key unit 100 is authentication information corresponding to authentication information specific to the key unit 100 mounted on the vehicle 10. Specifically, the control unit 203 transmits an issuance request for the terminal authentication information from the communication unit 202 to the center server 400 through the pickup-delivery management server 500. The "issuance request for the terminal authentication information" herein includes the identification information of the user terminal 200, the identification information of the pickup-delivery parcel, and a signal for requesting the issuance of the terminal authentication information specific to the key unit 100.

The center server 400 receives the issuance request for the terminal authentication information, and transmits the terminal authentication information specific to the key unit 100 mounted on the vehicle 10, to the user terminal 200. Thereby, it is possible to perform the operation for unlocking the vehicle 10, on the user terminal 200. When the user terminal 200 has no terminal authentication information, it is impossible to perform the locking operation and the unlocking operation on the operation screen for the vehicle 10.

In the first embodiment, for example, the terminal authentication information to be acquired by the user terminal 200 may be a one-time key that is invalidated by the locking of the vehicle cabin door or the luggage compartment door at the completion of the pickup-delivery work by the pickup-delivery user. For example, the terminal authentication information is stored in a storage unit (not illustrated) of the user terminal 200, at a timing when the terminal authentication information transmitted from the center server 400 is received by the user terminal 200, and thereafter, the terminal authentication information is deleted from the above storage unit, at a timing when a locking notice transmitted from the key unit 100 after the locking of the luggage compartment door at the completion of the pickup-delivery work is received by the user terminal 200.

The timing when the terminal authentication information stored in the storage unit of the user terminal 200 is deleted is not limited to the above example, and may be a timing when a predetermined time has elapsed since the time when the terminal authentication information transmitted from the center server 400 is received by the user terminal 200 (or the time when the center server 400 transmits the terminal authentication information to the user terminal 200). The terminal authentication information is not limited to the above one-time key, and may be a restricted key that is valid only in a predetermined time zone. The device authentication information corresponding to the terminal authentication information is stored in the key unit 100 in advance, regardless of whether the terminal authentication information is a one-time key or a restricted key.

Next, the user terminal 50 of the request user will be described. Similarly to the user terminal 200, for example, the user terminal 50 may be a small-size computer such as a smartphone, a cellular phone terminal, a tablet terminal, a personal information terminal and a wearable computer (a smartwatch and the like), or may be a personal computer. The user terminal 50 of the request user is configured to include a communication unit 51, a control unit 52 and an input-output unit 53.

The communication unit 51 is communication means for connection to the network N1, and has a function similar to the function of the communication unit 202. The control unit 52 is a computer that controls the user terminal 50. For example, the control unit 52 is constituted by a microcomputer. Programs stored in the storage means (a ROM and the like) mounted on the microcomputer are executed by a CPU (not illustrated) mounted on the microcomputer, so that functions for performing various processes are realized.

For example, the control unit 52 executes the application for using the service with the trunk sharing system 1, and performs the pickup-delivery request for the pickup-delivery parcel, to the pickup-delivery management server 500 of a predetermined delivery business operator through the communication unit 51. Together with the pickup-delivery request, for example, the designated pickup-delivery date and time and the information relevant to the pickup-delivery parcel, which are information input through the input-output unit 53, are transmitted to the pickup-delivery management server 500. For example, the information relevant to the pickup-delivery parcel is the size of the parcel, the weight of the parcel, information of whether upturning prohibition is designated, information of whether lower-loading prohibition is designated, and the like.

For example, the control unit 52 executes the application for using the vehicle loading determination service that is provided by the center server 400, and requests the vehicle loading determination for the parcel in the vehicle 10 to the center server 400 through the communication unit 51. Together with the request of the vehicle loading determination, for example, the information relevant to the parcel as the loading object, which is information input through the input-output unit 53, is transmitted to the center server 400. For example, the information relevant to the parcel as the loading object is the same as the information relevant to the pickup-delivery parcel.

The input-output unit 53 is means for accepting an input operation performed by the request user and presenting information to the request user, and has a function similar to the function of the input-output unit 204.

In FIG. 2, the user terminal 50 does not include a constituent corresponding to the short-range communication unit 201 explicitly. However, the user terminal 50 may include such a constituent. In this configuration, similarly to the control unit 203, the control unit 52 may perform a process of acquiring the terminal authentication information from the center server 400, and may transmit the terminal authentication information to the key unit 100 by a short-range wireless communication, and thereby, the user terminal 50 may actuate the locking-unlocking device 300.

Next, the pickup-delivery management server 500 will be described. The pickup-delivery management server 500 has a configuration of a general computer, and when a plurality of business operator joins the trunk sharing system 1 as described above, each business operator prepares at least one pickup-delivery management server as an own management server. The pickup-delivery management server 500 is a computer that has processors (not illustrated) including a CPU and a DSP, a main storage unit (not illustrated) including a RANI and a ROM, and an auxiliary storage unit (not illustrated) including an EPROM, an HDD and a removable medium.

Further, the pickup-delivery management server 500 includes a communication unit 501. The communication unit 501 is connected to another device (for example, the center server 400 or the user terminal 200), and performs communication between the pickup-delivery management server 500 and the device. For example, the communication unit 501 includes a local area network (LAN) interface board and a wireless communication circuit for wireless communication. The LAN interface board and the wireless communication circuit are connected to the network N1 such as the Internet that is a public communication network.

Further, the pickup-delivery management server 500 includes a pickup-delivery management database (DB) 503 that stores the above-described pickup-delivery information. The pickup-delivery management DB 503 is formed such that the pickup-delivery information is stored in the auxiliary storage unit, and in the pickup-delivery management DB 503, the request user and the pickup-delivery information are linked with each other. A program of a database management system (DBMS) to be executed by a processor manages data stored in the auxiliary storage unit, so that the pickup-delivery management DB 503 is constructed. For example, the pickup-delivery management DB 503 is a relational database. Details of the pickup-deliver information stored in the pickup-delivery management DB 503 will be described later with FIG. 3.

The pickup-delivery management DB 503 also stores therein vehicle management information in which the request user and the vehicle 10 as the corresponding pickup-delivery place are linked with each other. For example, the vehicle management information is information that is useful when the pickup-delivery user identifies the vehicle 10, as exemplified by the license number of the vehicle, the appearance of the vehicle and the position of the vehicle. Details of the vehicle management information will be described later with FIG. 4.

In the pickup-delivery management server 500, the above-described processor executes a program, so that a control unit 502 is formed as a function unit. The control unit 502 performs management control such as registration and update of the pickup-delivery information in the pickup-delivery management DB 503. For example, when the request user requests the pickup-delivery of the pickup-delivery parcel through the user terminal 50, the control unit 502 gives identification information to the pickup-delivery parcel, links the identification information of the request user with the identification information of the pickup-delivery parcel, the pickup-delivery type, the pickup-delivery date and time, the pickup-delivery place and the like, generates the pickup-delivery information corresponding to the request user, and stores the pickup-delivery information in the pickup-delivery management DB 503.

When a notice of information change of the pickup-delivery date and time or the pickup-delivery place is given from the request user after the generation of the pickup-delivery information, the control unit 502 updates the stored pickup-delivery information in accordance with the change. Further, the control unit 502 performs communication with the user terminal 200 of the pickup-delivery user through the communication unit 501, and also updates information that is included in the pickup-delivery information and that is relevant to the status of the pickup-delivery parcel. For example, the pickup-delivery user receives the status information (for example, information indicating the completion of the pickup-delivery) input through the input-output unit 204, from the user terminal 200, and the control unit 502 updates the corresponding pickup-delivery information.

After the control unit 502 receives the request of the pickup-delivery of the pickup-delivery parcel in which the pickup-delivery place is the vehicle 10 from the request user through the user terminal 50 and registers the pickup-delivery information corresponding to the request in the pickup-delivery management DB 503, the control unit 502 requests the center server 400 to perform the vehicle loading determination for the requested pickup-delivery parcel. When the control unit 502 receives a notice that the pickup-delivery parcel can be loaded in the vehicle 10 from the center server 400, the control unit 502, for example, registers the loading position of the pickup-delivery parcel in the vehicle 10, which is given together with the notice, in the pickup-delivery information corresponding to the pickup-delivery parcel. When the control unit 502 receives a notice that the pickup-delivery parcel cannot be loaded in the vehicle 10 from the center server 400, the control unit 502, for example, transfers the notice to the user terminal 50 of the request user through the user terminal 50 of the request user, the management server for the product purchase site or C-to-C site.

The control unit 502 transmits an instruction of the pickup-delivery to the user terminal 200 of the pickup-delivery user, based on the pickup-delivery information and vehicle management information linked with the request user, such that the pickup-delivery user can perform the pickup-delivery of the pickup-delivery parcel for the vehicle 10. Together with the instruction of the pickup-delivery, for example, the control unit 502 gives a notice of the identification information of the request user, the identification information of the pickup-delivery parcel and the loading position in the vehicle 10, which are included in the pickup-delivery information, a notice of the license number of the vehicle 10 and the vehicle position, which are included in the vehicle management information, and the like. The control unit 502 may transmit the instruction of the pickup-delivery to the user terminal 200 not once but multiple times. For example, the control unit 502 may transmit the whole of the pickup-delivery instruction relevant to the pickup-delivery on a planned pickup-delivery date, to the user terminal 200 of the pickup-delivery user, on the day before the planned pickup-delivery date, and may transmit the pickup-delivery instruction on the pickup-delivery date again. In the case where the pickup-delivery information is updated, the updated content is reflected at the time of the retransmission.

Some of the functional constituent elements of the pickup-delivery management server 500 or some of the processes may be executed by another computer that is connected to the network N1. Further, a sequence of processes to be executed by the pickup-delivery management server 500 may be executed by hardware, or may be executed by software.

Next, the center server 400 will be described. The center server 400 also has a configuration of a general computer, has the same basic hardware configuration as the pickup-delivery management server 500, and has unillustrated processors, an unillustrated main storage and an unillustrated auxiliary storage unit. Accordingly, programs stored in the auxiliary storage unit are loaded into a working area of the main storage unit and are executed. By the execution of the programs, constituent parts and the like are controlled, so that functions corresponding to predetermined purposes can be realized. The center server 400 also includes a communication unit 401. The communication unit 401 has a function similar to the function of the communication unit 501 of the pickup-delivery management server 500, and performs communication between the center server 400 and another device (for example, the pickup-delivery management server 500 or the user terminal 50 of the request user).

Further, in the auxiliary storage unit, the center server 400 includes a user information DB 403, an authentication information DB 404 and a vehicle loading information DB 405 that store a variety of information. Programs of a database management system to be executed by a processor manage data stored in the auxiliary storage unit, so that the databases (DB) are constructed. For example, each of the user information DB 403, the authentication information DB 404 and the vehicle loading information DB 405 is a relational database.

The user information DB 403 stores therein the identification information of a user who uses the vehicle 10 (for example, the pickup-delivery user who delivers the pickup-delivery parcel to the vehicle 10, or the request user who collects the delivered pickup-delivery parcel), the corresponding password, and the like.

The authentication information DB 404 stores therein the authentication information of the vehicle 10 that corresponds to the above terminal authentication information. The authentication information of the vehicle 10 is information associated with the identification information (key ID) of the vehicle 10, and for example, may be the identification information specific to the key unit 100 of the in-vehicle device 10A. In addition to the authentication information of the vehicle 10, the authentication information DB 404 may store therein information of a valid period (including a valid time zone) of the authentication information, information of whether the authentication information has expired, or the like. The valid period of the authentication information may be transmitted to the user terminal 200 of the pickup-delivery user, together with the authentication information. When the user terminal 200 of the pickup-delivery user receives the valid period of the authentication information, the user terminal 200 of the pickup-delivery user can delete and invalidate the authentication information after the elapse of the valid period. The information of whether the authentication information has expired indicates whether the authentication information is in a valid state when the authentication information is transmitted to the user terminal 200 or in an expired state after the elapse of the valid period. When the authentication information is in the valid state when the authentication information is transmitted to the user terminal 200, an authentication information management unit 4021 described later prevents the authentication information from being issued with the valid period overlapped, and thereby, can avoid an overlapped issuance of the authentication information.

The vehicle loading information DB 405 stores therein information relevant to the loading region in the vehicle 10. Examples of the information relevant to the loading region in the vehicle 10 include dimensions of each loading region and a loading state of the parcel in each loading region. The vehicle loading information DB 405 also stores therein the pickup-delivery information (received from the pickup-delivery management server 500) given together with the request of the vehicle loading determination, or the information (received from the user terminal 200 of the request user) relevant to the parcel as the loading object. Details of the vehicle loading information to be stored in the vehicle loading information DB 405 will be described later with FIG. 5.

In the center server 400, the above-described processor executes a program, so that a control unit 402 is formed as a function unit. The control unit 402 performs the vehicle loading determination process for the pickup-delivery parcel, the issuance control process for the authentication information to the user terminal 200 or the like, and the management of the vehicle loading information. Specifically, the control unit 402 includes the authentication information management unit 4021, a loading determination unit 4022 and a loading information management unit 4023, as function units.

The authentication information management unit 4021 performs the issuance control process for the authentication information for locking and unlocking the vehicle 10. Specifically, the authentication information management unit 4021 accepts the issuance request for the authentication information for locking and unlocking the vehicle 10, from the user terminal 200 of the pickup-delivery user through the pickup-delivery management server 500. Together with the issuance request for the authentication information, the authentication information management unit 4021 receives the information about the user terminal 200 that is the issuance destination of the authentication information. The authentication information management unit 4021 transmits the authentication information (terminal authentication information) corresponding to the key unit 100, to the user terminal 200 through the pickup-delivery management server 500. The authentication information management unit 4021 may generate authentication information including the information of the valid period. When the valid period has elapsed, the key unit 100 of the in-vehicle device 10A regards the authentication information as being in an expired state, and does not execute the locking and unlocking of the vehicle 10, even if the key unit 100 of the in-vehicle device 10A receives the authentication information including the valid period.

The loading determination unit 4022 performs the vehicle loading determination process. Specifically, the loading determination unit 4022 accepts the request of the vehicle loading determination from the user terminal 50 of the request user or from the pickup-delivery management server 500. Together with the request of the vehicle loading determination, the loading determination unit 4022, for example, receives the information relevant to the parcel as the loading object, from the user terminal 50 of the request user, and receives the pickup-delivery information corresponding to the pickup-delivery parcel, from the pickup-delivery management server 500. The loading determination unit 4022 receives the request of the vehicle loading determination from the user terminal 50 of the request user, for example, when the request user makes the user terminal 50 execute the application for using the vehicle loading determination service provided by the center server 400 and inputs the request of the vehicle loading determination process to the user terminal 50. The loading determination unit 4022 receives the request of the vehicle loading determination from the pickup-delivery management server 500, for example, when the request user makes the user terminal 50 execute the application for using the service provided by the trunk sharing system 1 and requests the pickup-delivery through the user terminal 50.

For example, the loading determination unit 4022 determines whether the parcel can be loaded in the vehicle 10 and the loading position of the pickup-delivery parcel, based on the information of dimensions allowing the loading in the loading regions of the vehicle 10, which is the information stored in the vehicle loading information DB 405, and the information relevant to the parcel as the loading object or the size of the parcel included in the pickup-delivery information. The loading determination unit 4022 transmits the result of the determination of whether the parcel can be loaded in the vehicle 10 and the loading position of the parcel when the parcel can be loaded, to the user terminal 50 or the pickup-delivery management server 500 that is the request source.

The loading information management unit 4023 manages the vehicle loading information DB 405. Specifically, for example, when the loading information management unit 4023 receives the information relevant to the parcel as the loading object or the pickup-delivery information from the user terminal 50 of the request user or the pickup-delivery management server 500 together with the request of the vehicle loading determination, the loading information management unit 4023 stores the information in the vehicle loading information DB 405. Further, the loading information management unit 4023 receives the capture image of the interior of the vehicle cabin or the interior of the luggage compartment that is captured by the camera 390, from the data communication device 350 of the vehicle 10, acquires loading-allowing dimensions of the loading regions, from the capture image, and updates the vehicle loading information in the vehicle loading information DB 405.

The loading-allowing dimensions of the loading region are not default dimensions, but dimensions of a space that is in the loading region and that can be used for the loading of the parcel. For example, when the parcel is placed in a certain loading region, the loading-allowing dimensions of the certain loading region are dimensions resulting from subtracting the dimensions of the parcel from the default dimensions. That is, the loading-allowing dimensions are the dimensions of the remaining space of the loading region that can be used for the loading of the parcel, and vary depending on the loading or unloading of the parcel, for example. The loading information management unit 4023 receives a notice of loading completion or unloading completion from the user terminal 50 of the request user, and receives a notice of pickup-delivery completion from the user terminal 200 of the pickup-delivery user through the pickup-delivery management server 500, to manage the loading-allowing dimensions of the loading region in response to the notice.

Some of the functional constituent elements of the center server 400 or some of the processes may be executed by another computer that is connected to the network N1. Further, a sequence of processes to be executed by the center server 400 may be executed by hardware, or may be executed by software.

FIG. 3 is a diagram showing an exemplary table configuration of a pickup-delivery information table. For example, the pickup-delivery information table is stored in the pickup-delivery management DB 503 of the pickup-delivery management server 500. The pickup-delivery information table includes fields of request user ID, parcel ID, pickup-delivery type, pickup-delivery date and time, pickup-delivery place, pickup-delivery status, pickup-delivery user ID, parcel size, parcel weight, upturning prohibition, lower-loading prohibition, pickup-delivery position and layout change.

In the request user ID field, the identification information for identifying the request user is input. In the parcel ID field, the identification information for identifying the parcel is input. In the pickup-delivery type field, information for identifying whether the pickup-delivery parcel is delivered or picked up by the pickup-delivery user is input. In the pickup-delivery date and time field, information indicating date and time when the pickup-delivery parcel is picked up or delivered is input. Particularly, as the pickup-delivery time, a specified time may be input, or a specified time zone during which the pickup-delivery is required may be input. In the case where the pickup-delivery date and time is designated by the request user, the designated pickup-delivery date and time is input in the pickup-delivery date and time field. In the case where the pickup-delivery date and time is not designated by the request user, the information of the pickup-delivery date and time is input in the pickup-delivery date and time field after the decision of a pickup-delivery schedule, for example.

In the pickup-delivery place field, information indicating a pickup-delivery place designated by the request user is input. For example, a value such as "HOME", "VEHICLE" or "OFFICE" is input in the pickup-delivery place field. The pickup-delivery information is linked with an address of a pickup-delivery destination of the pickup-delivery parcel as the object, depending on the value such as "HOME", "VEHICLE" or "OFFICE" that is input in the pickup-delivery place field (not illustrated). Particularly, the pickup-delivery information in which "VEHICLE" is input in the pickup-delivery place field is linked with the vehicle management information described later with FIG. 4 and the identification information of the request user.

In the pickup-delivery status field, information indicating whether the pickup-delivery of the pickup-delivery parcel has been completed by the pickup-delivery user is input. For example, when the pickup-delivery of the pickup-delivery parcel has been completed, "COMPLETED" is input, and when the pickup-delivery has not been completed, "NOT COMPLETED" is input.

In the pickup-delivery user ID field, the identification information of a pickup-delivery user by which the pickup-delivery of the pickup-delivery parcel is planned to be performed is input. For example, in the case where the service used by the request user is a C-to-C service, the identification information of a pickup-delivery user designated by the request user together with the pickup-delivery request is input in the pickup-delivery user ID field. For example, in the case where the service used by the request user is an EC site or a site of a delivery business operator, the identification information of the pickup-delivery user is input in the pickup-delivery user ID field, after the pickup-delivery schedule is decided and further the pickup-delivery user is decided by the pickup-delivery management server 500.

In the parcel size field, the size of the pickup-delivery parcel is stored. For example, data in a format of length (cm)×width (cm)×height (cm) is input as the size of the pickup-delivery parcel. In the parcel weight field, the weight of the pickup-delivery parcel is stored. For example, the weight of the pickup-delivery parcel is optional. In the upturning prohibition field, information of whether upturning prohibition is designated for the pickup-delivery parcel is input. In the lower-loading prohibition field, information of whether lower-loading prohibition is designated for the pickup-delivery parcel is input.

The size of the pickup-delivery parcel, the weight of the pickup-delivery parcel, the information of whether the upturning prohibition is designated and the information of whether the lower-loading prohibition is designated are received from the user terminal 50 of the request user together with the pickup-delivery request, or are received together with a delivery request from a business operator from which the request user purchases a product. For example, the size or weight of the pickup-delivery parcel may be directly input through the user terminal 50 by the request user, or a size or weight that is closest to but does not exceed the actual size or weight of the pickup-delivery parcel may be selected from a plurality of options.

In the pickup-delivery position field, information indicating the loading position of the pickup-delivery parcel is input. For example, identification information of the loading regions in the vehicle 10 such as an assistant driver's seat, a rear right seat, a rear left seat, a trunk right front, a trunk middle front and a trunk left front is input in the pickup-delivery position field. For example, when the pickup-delivery management server 500 receives the result of the vehicle loading determination from the center server 400, the result is input in the pickup-delivery position field.

In the layout change field, information indicating whether layout change is possible is input. For example, the layout change is a movement of a parcel already loaded in the vehicle 10, or loading of a parcel to a region other than the loading region corresponding to a loading position designated by the request user. Whether the layout change is possible may be designated by the request user for each pickup-delivery request, or may be set by the request user in advance of the pickup-delivery request.

The information relevant to the parcel as the loading object to be transmitted together with the request of the vehicle loading determination to be transmitted when the request user makes the user terminal 50 execute the application using the service of the vehicle loading determination that is provided by the center server 400 includes, for example, information corresponding to the fields of the request user ID, the parcel ID, the parcel size, the parcel weight, the upturning prohibition, the lower-loading prohibition, the designation of the pickup-delivery position and the layout change in the pickup-delivery information shown in FIG. 3.

FIG. 4 is a diagram showing an exemplary table configuration of the vehicle management information. For example, the vehicle management information is stored in the pickup-delivery management DB 503 of the pickup-delivery management server 500. In the vehicle management information, the request user and the vehicle 10 as the corresponding pickup-delivery place are linked with each other. For example, the vehicle management information table includes a request user ID field, a vehicle ID field, a vehicle model field, a color field, a license number field and a vehicle position field.

In the request user ID field, the identification information of the request user is input. In the vehicle ID field, the identification information of the vehicle 10 is input. The vehicle model field, the color field and the license number field are information for identifying the vehicle 10 such that the pickup-delivery user can find the vehicle 10 when the request user selects the vehicle 10 as the pickup-delivery place. In the vehicle model field, information indicating the vehicle model of the vehicle 10 is input. In the color field, information indicating the color of the vehicle 10 is input. In the license number filed, an identification number described on a license number plate of the vehicle 10 is input.

In the vehicle position field, positional information of the vehicle 10 is input. The positional information of the vehicle 10 may be acquired by an input from the request user through the user terminal 50, or the positional information of the vehicle 10 that is obtained by the center server 400 through the data communication device 350 provided in the vehicle 10 may be acquired from the center server 400. The center server 400 may have the same information as the vehicle management information. For example, when the pickup-delivery schedule for the parcel is decided, the vehicle management information shown in FIG. 4 is transmitted to the user terminal 200 of the pickup-delivery user, together with the pickup-delivery information corresponding to the pickup-delivery parcel. Thereby, the pickup-delivery user can know the position (address) of the vehicle 10 that is the pickup-delivery place, and can identify the vehicle 10 from the vehicle model, the color, the license number and the like.

FIG. 5 is a diagram showing an exemplary table configuration of the vehicle loading information. For example, the vehicle loading information is stored in the vehicle loading information DB 405 of the center server 400. For example, the vehicle loading information is information relevant to the loading state of the parcel in each loading region of the vehicle 10 of the request user. The vehicle loading information table includes a request user ID field, a vehicle ID field, a region field, a dimension field, a child seat field, a loading-allowing dimension field and a loading parcel ID field.

In the request user ID field, the identification information of the request user is input. In the vehicle ID field, the identification information of the vehicle 10 is input. In the region field, the identification information of the loading region contained in the vehicle 10 is input. As the loading region contained in the vehicle 10, for example, when one unit of the loading region is one seat or one luggage compartment, there are "ASSISTANT DRIVER'S SEAT", "REAR RIGHT SEAT", "REAR LEFT SEAT" and "TRUNK ROOM (WHOLE)" in the case of a two-row passenger car. Further, a plurality of units of loading regions may be combined to be used. In the example shown in FIG. 5, as the combination of a plurality of units of loading regions, there are "REAR SEAT" and "ASSISTANT DRIVERS SEAT+REAR LEFT SEAT". The "REAR SEAT" that is a combination of the plurality of units of loading regions is the combination of the rear right seat and the rear left seat.

Further, one unit of the loading region may be divided to be used. Hereinafter, a loading region that is obtained by dividing one unit of the loading region is referred to as a divided loading region. As the divided loading region, for example, when the trunk room is divided into six regions in a front-rear direction and a right-left direction, there are "TRUNK RIGHT FRONT", "TRUNK MIDDLE FRONT", "TRUNK LEFT FRONT", "TRUNK RIGHT REAR", "TRUNK MIDDLE REAR" and "TRUNK LEFT REAR". A plurality of divided loading regions may be combined to be used. As the combination of a plurality of divided loading regions, for example, there are "TRUNK FRONT HALF", "TRUNK REAR HALF", "TRUNK RIGHT FRONT+RIGHT REAR", "TRUNK MIDDLE FRONT+MIDDLE REAR" and "TRUNK LEFT FRONT+LEFT REAR".

The "TRUNK FRONT HALF" is the combination of "TRUNK RIGHT FRONT", "TRUNK MIDDLE FRONT" and "TRUNK LEFT FRONT". The "TRUNK REAR HALF" is the combination of "TRUNK RIGHT REAR", "TRUNK MIDDLE REAR" and "TRUNK LEFT REAR". The definition of the loading region shown in FIG. 5 is an example, and how the loading region is defined depends on the vehicle model of the vehicle 10, the management operator for the center server 400, request user's intention and the like.

In the dimension field, information of default dimensions of each loading region is input. For example, the default dimensions of each loading region may be acquired by the center server 400 based on the vehicle model of the vehicle 10, may be input from the user terminal 50 by the request user, or may be acquired by analyzing the capture image of the interior of the vehicle cabin or luggage compartment of the vehicle 10 that is captured by the camera 390. For example, data is input in the dimension field, in a format of vehicle-width-directional length (cm)×vehicle-longer-directional length (cm)×height (cm).

In the child seat field, information indicating whether a child seat is equipped in the loading region is input. For example, the information of whether the child seat is equipped may be input from the user terminal 50 by the request user, or may be acquired by analyzing the capture image of the interior of the vehicle cabin of the vehicle 10 that is captured by the camera 390. When information indicating that the child seat is equipped is input in the child seat field, another parcel is regarded as being unable to be loaded in the loading region, and the loading-allowing dimension described later is set to zero, for example. Alternatively, when the information indicating that the child seat is equipped is input in the child seat field, predetermined dimensions allowing the loading on the child seat may be input, for example.

In the loading-allowing dimension field, information of dimensions of a space in which the parcel in the loading region can be loaded, that is, loading-allowing dimensions are input. When no parcel (including the child seat) has been loaded in the loading region, the same values as the values of the dimension field are input in the loading-allowing dimension field. The values of the loading-allowing dimension field vary depending on the loading and unloading of the parcel in the corresponding loading region. For example, when a parcel designating "LOWER-LOADING PROHIBITION" is loaded in the loading region, the values of the loading-allowing dimension field for the loading region are updated to zero. Thereby, when the parcel designating "LOWER-LOADING PROHIBITION" is loaded, it is possible to prevent any further parcels from being loaded in the loading region.

For example, when the parcel designating "LOWER-LOADING PROHIBITION" is loaded in the loading region, the values of the loading-allowing dimension field for the loading region are updated to values resulting from subtracting the dimensions of the loaded parcel+α. After the parcel is unloaded from the loading region, the values of the loading-allowing dimension field are updated to values resulting from adding the dimensions of the parcel. However, when no parcel has been loaded in the loading region, the values of the loading-allowing dimension field are updated to the values of the dimension field.

In the loading parcel ID field, the identification information of a parcel that is planned to be loaded in the loading region or the identification information of a parcel that has been loaded is input. The identification information of the parcel is input in the loading parcel ID field, in a loading order. For example, when it is determined that the loading region is the loading position of the parcel as a result of the vehicle loading determination process by the center server 400, the identification information of the parcel is input in the loading parcel ID field. For example, when a notice indicating completion of loading of the parcel is received by the center server 400, information indicating the loading completion is input in the loading parcel ID field in which the identification information of the parcel has been input. As in the example shown in FIG. 5, as the information indicating the completion of loading of the parcel, the background color of the loading parcel ID field in which the identification information of the parcel has been input is reversed.

For example, when a notice indicating completion of unloading of the parcel is received by the center server 400, the identification information of the parcel is deleted from the loading parcel ID field.

Here, relations among the loading regions are defined in an unillustrated table. For example, when a parcel using the region "TRUNK FRONT HALF" has been loaded, the values of the loading-allowing dimension field for "TRUNK FRONT HALF" are updated, and further, the values of the loading-allowing dimension fields of "TRUNK RIGHT FRONT", "TRUNK MIDDLE FRONT", "TRUNK LEFT FRONT" and "TRUNK (WHOLE)", which are associated with "TRUNK FRONT HALF", are updated.

The configurations of the tables shown in FIG. 3 to FIG. 5 are not limited to the examples, and can be appropriately modified depending on the mode for carrying out the disclosure.

Flow of Process

Figure 6A:
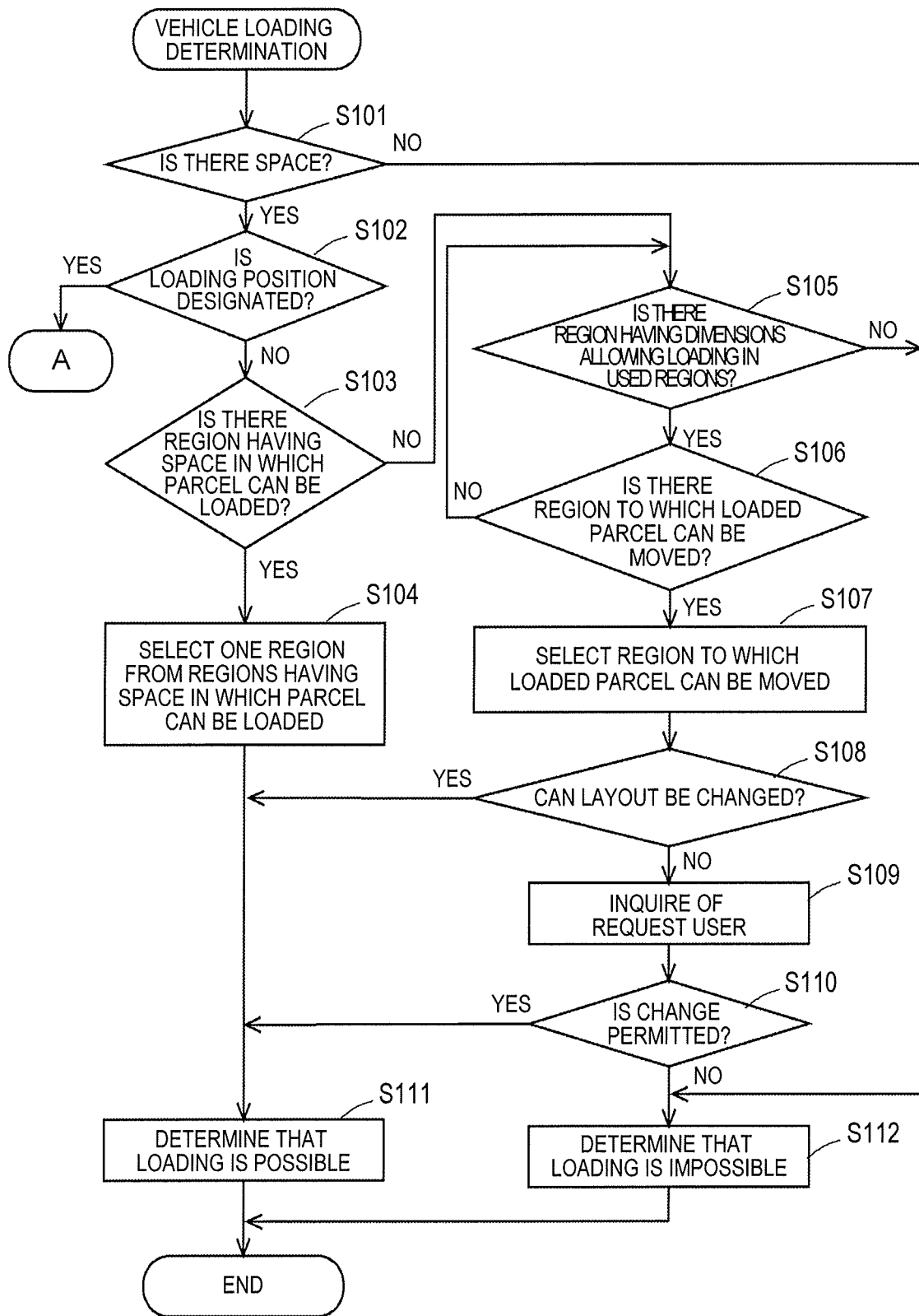
FIG. 6A is an exemplary flowchart of a vehicle loading determination process that is executed by the center server.
Figure 6B:
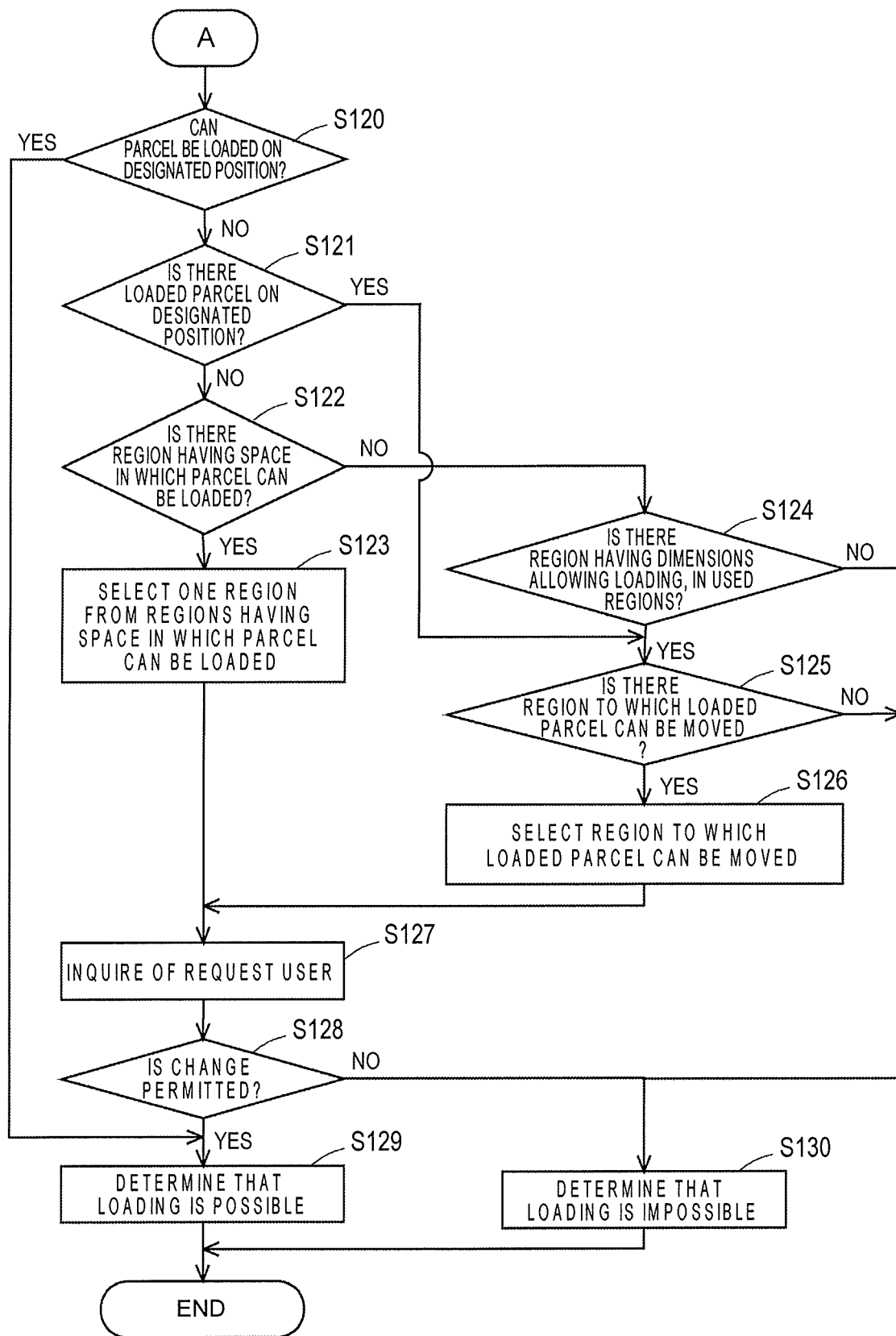
FIG. 6B is an exemplary flowchart of the vehicle loading determination process that is executed by the center server.

FIG. 6A and FIG. 6B are exemplary flowcharts of the vehicle loading determination process that is executed by the center server 400. The vehicle loading determination process shown in FIG. 6A and FIG. 6B is started, for example, by being called from another process that is being executed in the center server 400. The subject of the execution of the process shown in FIG. 6A and FIG. 6B is the CPU that is mounted on the center server 400, but for convenience sake, descriptions will be made assuming that the subject is the loading determination unit 4022 that is a functional constituent. For the subsequent flowcharts, similarly, descriptions will be made assuming that the subject is a functional constituent.

In S101, the loading determination unit 4022 determines whether there is a loading region having a space in the vehicle 10. For example, the loading region having a space is a loading region for which the values of the loading-allowing dimension field are equal to or more than predetermined thresholds, in the vehicle loading information. Hereinafter, the space means a space having loading-allowing dimensions equal to or more than predetermined thresholds, in the loading region.

When the positive determination is made in S101, the process proceeds to S102, and when the negative determination is made, the process proceeds to S112. In S112, the loading determination unit 4022 determines that the loading is impossible, and thereafter, the process shown in FIG. 6A ends.

In S102, the loading determination unit 4022 determines whether the loading position is designated. When the loading position is designated by the request user, the designation of the loading position is received, for example, together with the request of the vehicle loading determination. When the positive determination is made in S102, the process proceeds to S120 in FIG. 6B, and when the negative determination is made, the process proceeds to S103.

Processes in S103 to S110 are processes when the loading position is not designated by the request user. In S103, the loading determination unit 4022 determines whether there is a loading region having a space in which the parcel as the object of the vehicle loading determination (hereinafter, referred to as the parcel as the object) can be loaded. For a certain loading region, whether the parcel can be loaded in the space is determined, for example, based on whether the values of the vehicle-width-directional length, vehicle-longer-directional length and height of the loading-allowing dimensions of the loading region are respectively more than the values of the length, width and height of the parcel or the values of the width, length and height of the parcel.

When "UPTURNING PROHIBITION" is not designated for the parcel as the object, for example, the values of the vehicle-width-directional length, vehicle-longer-directional length and height of the loading-allowing dimensions of the loading region are respectively more than the values of the length, height and width of the parcel, the values of the width, height and length of the parcel, the values of the height, length and width of the parcel, or the values of the height, width and length of the parcel. The dimensions of the parcel as the object and the information of whether "UPTURNING PROHIBITION" is designated are received together with the request of the vehicle loading determination, for example. When the positive determination is made in S103, the process proceeds to S104, and when the negative determination is made, the process proceeds to S105.

In S104, the loading determination unit 4022 selects one loading region as the loading position of the object parcel, from loading regions having the space in which the parcel as the object can be loaded. For example, the loading determination unit 4022 selects, as the loading position of the object parcel, a loading region having the smallest space, a loading region in which no parcel has been loaded, or a loading region in which no parcel has been loaded and that has the smallest loading-allowing dimensions, from loading regions having the space in which the parcel as the object can be loaded. Next, the process proceeds to S111, and the loading determination unit 4022 determines that the parcel as the object can be loaded in the vehicle 10.

In S105, the loading determination unit 4022 determines whether there is a loading region having dimensions allowing the parcel as the object to be loaded, in used loading regions. For example, the used loading region is a loading region for which the values of the loading-allowing dimension field in the vehicle loading information are zero or less than the predetermined thresholds, that is, a loading region having no space. When the positive determination is made in S105, the process proceeds to S106. When the negative determination is made in S105, the process proceeds to S112, and the loading determination unit 4022 determines that the parcel as the object cannot be loaded in the vehicle 10.

In S106, for a single loading region of the loading regions detected in S105, the loading determination unit 4022 determines whether there is a loading region having a space in which a parcel loaded in the single loading region can be loaded. For example, the loading region to be processed in S106 may be any of a loading region in which the smallest number of parcels are loaded, a loading region in which the largest number of parcels are loaded, a loading region in which a parcel having the smallest dimensions is loaded, a loading region in which a parcel having the largest dimensions is loaded, a loading region that has the smallest dimensions and a loading region that has the largest dimensions, each of which is one of the loading regions detected in S105.

When the positive determination is made in S106, the process proceeds to S107. When the negative determination is made in S106, the process proceeds to S105, and the loading determination unit 4022 performs the determination of S105, with the exception of the loading region processed in S106.

In S107, the loading determination unit 4022 selects one loading region, as a loading region to which the loaded parcel is moved, from the loading regions detected in S106. As the loading region to be selected, for example, a loading region having the smallest space is selected from the loading regions detected in S106.

In S108, the loading determination unit 4022 determines whether the layout change is possible as the setting. The setting of whether the layout change is possible is received together with the request of the vehicle loading determination, for example. When there is no setting of whether the layout change is possible, the negative determination is made in S108. When the positive determination is made in S108, the process proceeds to S111, and it is determined that the parcel as the object can be loaded. When the negative determination is made in S108, the process proceeds to S109.

In S109, the loading determination unit 4022 transmits a notice for inquiring whether the layout change is possible, to the user terminal 50 of the request user or through the pickup-delivery management server 500 to the user terminal 50 of the request user. Together with this notice, a notice of a new loading position of the parcel as the loading object and a notice of a destination position of the parcel to be moved may be given.

In S110, the loading determination unit 4022 determines whether a permission response, to the inquiry of whether the layout change is possible, has been transmitted from the user terminal 50 of the request user. For example, when the response has not been transmitted from the user terminal 50 of the request user even if a predetermined time has elapsed, the negative determination is made in S110. When the positive determination is made in S110, the process proceeds to S111, and it is determined that the parcel as the object can be loaded. When the negative determination is made in S110, the process proceeds to S112, and it is determined that the parcel as the object cannot be loaded.

The process shown in FIG. 6B is a process when the loading position of the parcel as the object is designated by the request user. In the process shown in FIG. 6B, when it is determined that the parcel as the object cannot be loaded on the designated position, a notice for inquiring whether the layout change is possible is transmitted to the request user, regardless of whether the layout change is possible as the setting. Specifically, the process is shown as follows.

In S120, the loading determination unit 4022 determines whether the parcel as the object can be loaded in the loading region corresponding to the position designated by the request user. When the positive determination is made in S120, the process proceeds to S129, and in S129, it is determined that the parcel as the object can be loaded. When the negative determination is made in S120, the process proceeds to S121.

In S121, the loading determination unit 4022 determines whether there is a loaded parcel in the loading region corresponding to the position designated by the request user. When the positive determination is made in S121, it is shown that there is a possibility that the parcel as the object cannot be loaded due in part to the parcel already existing on the position designated by the request user, and the process proceeds to S125. When the negative determination is made in S121, it is shown that there is a possibility that the parcel as the object cannot be loaded on the position designated by the request user because the parcel itself has a large size, and the process proceeds to S122.

In S122, the loading determination unit 4022 determines whether there is a loading region having a space in which the parcel as the object can be loaded, and when the positive determination is made, one region is selected as the loading position of the parcel as the object in S123 Thereafter, the process proceeds to S127.

When the negative determination is made in S122, it is determined in S124 that there is a loading region having dimensions allowing the parcel as the object to be loaded, in the used regions. When the positive determination is made in S124, it is determined in S125 whether there is a loading region to which the loaded parcel can be moved, in the loading regions detected in S124. When the negative determination is made in S125, the process proceeds to S130. When the negative determination is made in S124, it is determined in S130 that the parcel as the object cannot be loaded.

When the positive determination is made in S125, a loading region to which the loaded parcel is moved, in S126, is selected from the loading regions detected in S125. Thereafter, the process proceeds to S127.

In S127, the request user is inquired about whether the layout change is possible. When the permission by the request user is obtained in S128, it is determined in S129 that the parcel as the object can be loaded. When the permission by the request user is not obtained in S128, it is determined in S130 that the parcel as the object cannot be loaded.

For example, when the positive determination is made in S122, the information that the loading on the designated position is impossible and the information of the loading region selected as a candidate of the loading position of the parcel as the object in S123 are transmitted to the user terminal 50 of the request user, together with the inquiry of whether the layout change is possible in S127. For example, when the negative determination is made in S122, the information that the loading on the designated position is impossible, the information of the loading region selected as a candidate of the loading position of the parcel as the object in S124, and the loading region to which the parcel loaded in the loading region selected in S124 is moved are transmitted to the user terminal 50 of the request user, together with the inquiry of whether the layout change is possible in S127.

The processes in S122 to S130 correspond to the processes in S103 to S107, S109 to S112 in FIG. 6A, respectively.

Figure 7:
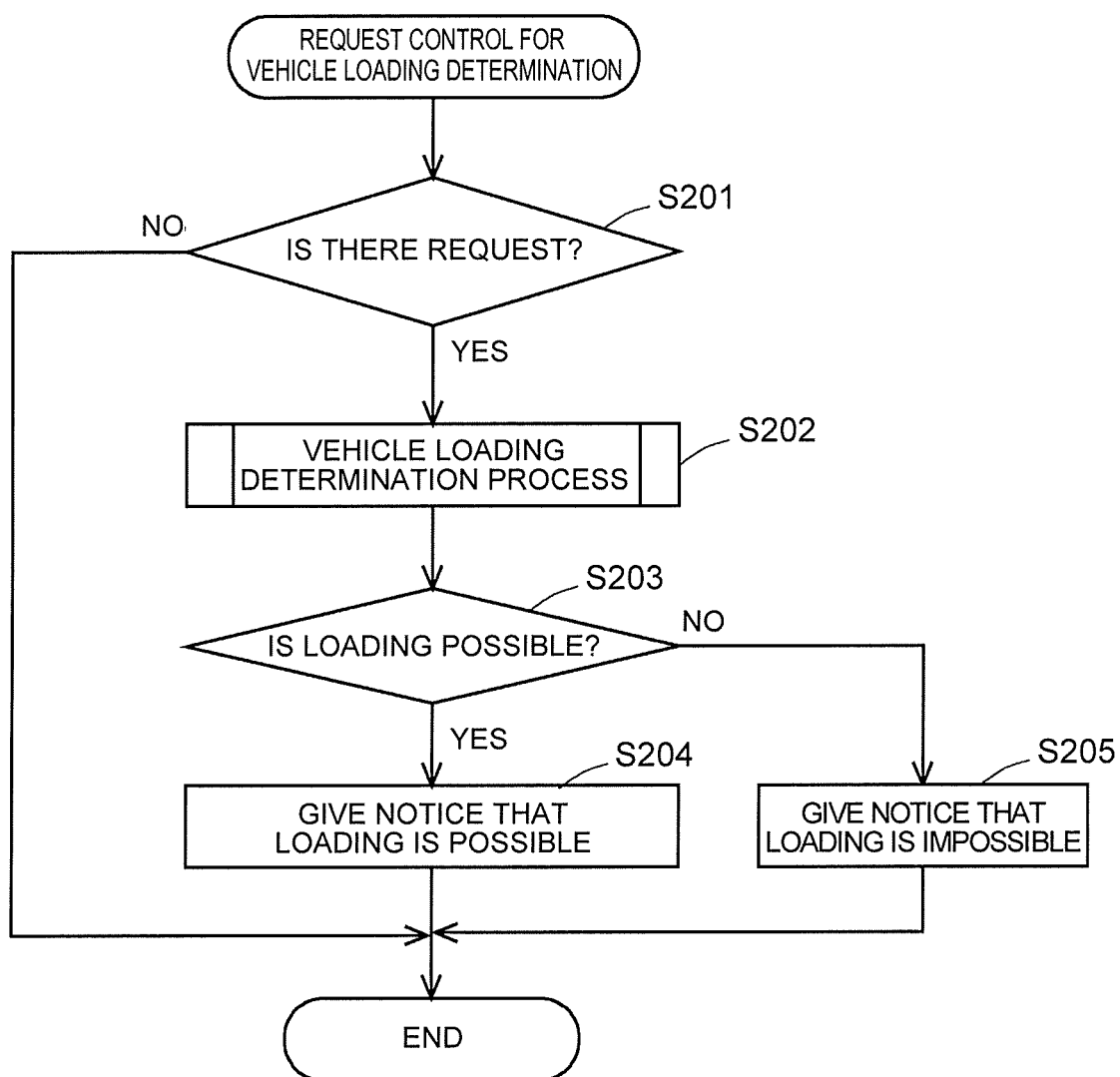
FIG. 7 is an exemplary flowchart of a request control process for vehicle loading determination that is executed by the center server.
Figure 8:
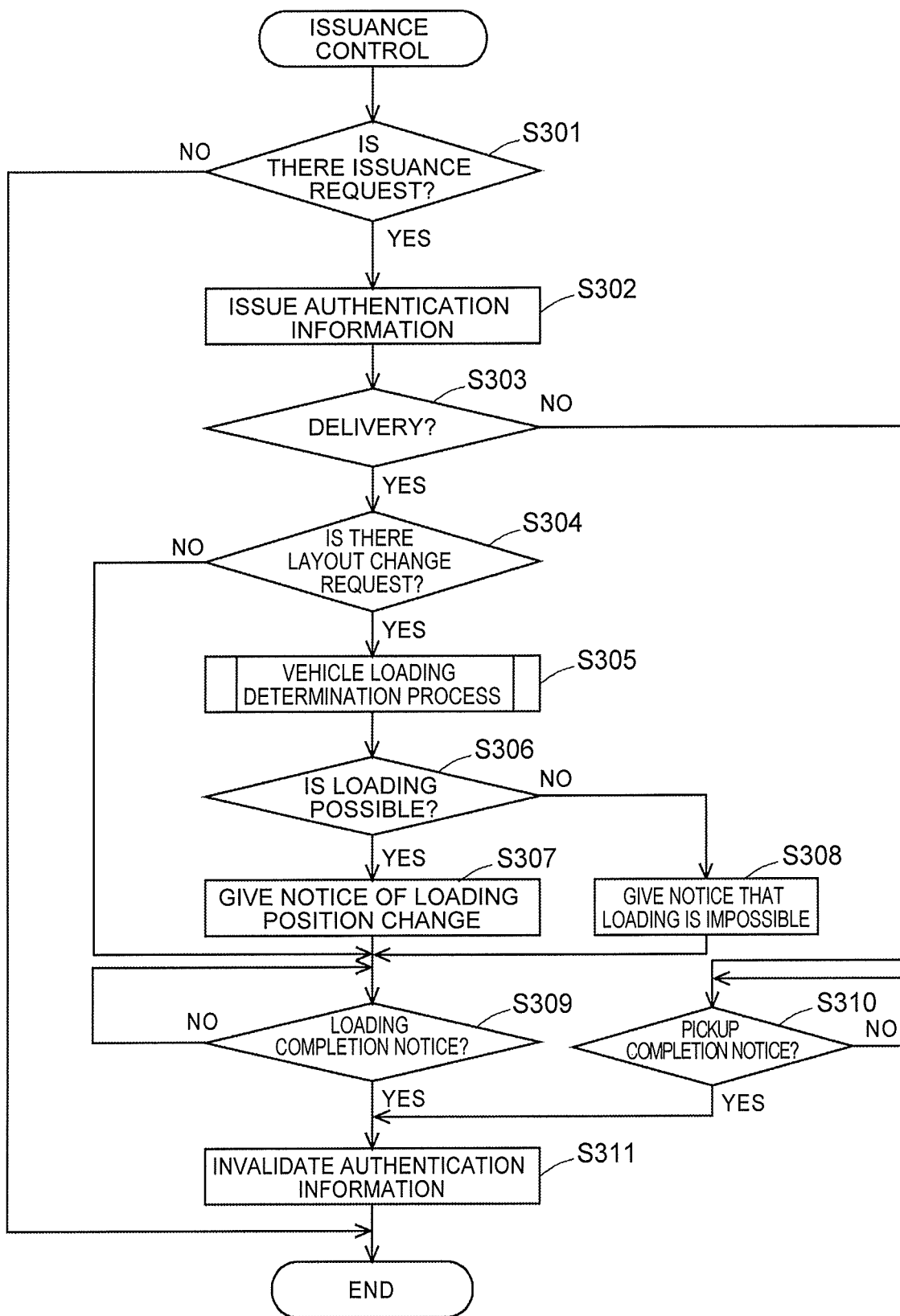
FIG. 8 is an exemplary flowchart of an issuance control process for authentication information that is executed by the center server.
Figure 9:
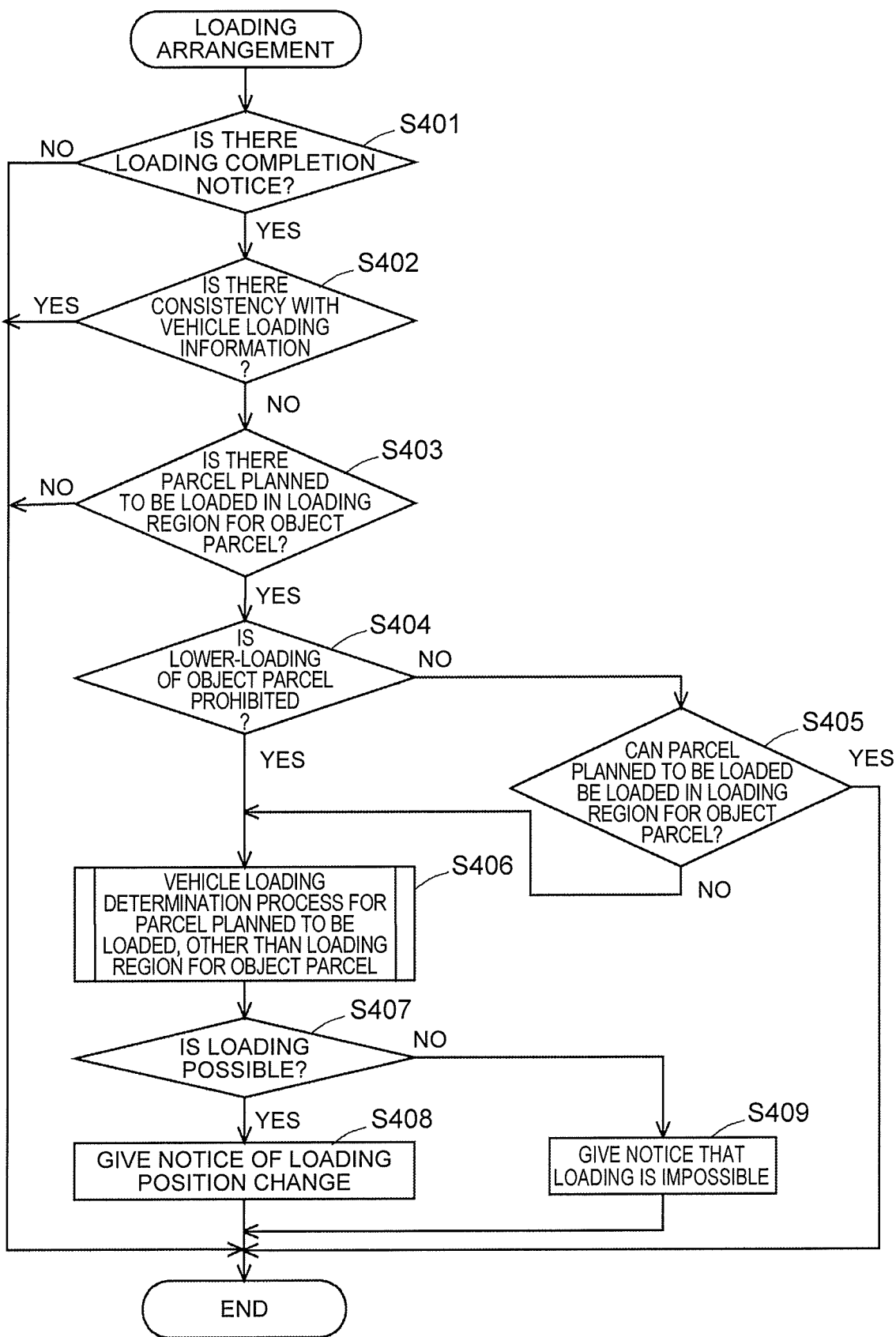
FIG. 9 is an exemplary flowchart of a loading arrangement process that is executed by the center server.

Each of FIG. 7, FIG. 8 and FIG. 9 is an exemplary process for calling the vehicle loading determination process shown in FIG. 6A and FIG. 6B, and is executed by the center server 400. FIG. 7 is an exemplary flowchart of a request control process for the vehicle loading determination that is executed by the center server 400. The request control process for the vehicle loading determination is a process that is executed when the request of the vehicle loading determination is received. For example, the process shown in FIG. 7 is executed repeatedly with a predetermined period.

In S201, the loading determination unit 4022 determines whether the request of the vehicle loading determination has been received. For example, the request of the vehicle loading determination is received from the pickup-delivery management server 500 that has received the pickup-delivery request from the user terminal 50 of the request user, or the user terminal 50 to which the request of the vehicle loading determination has been input by the request user. For example, the pickup-delivery information or the information relevant to the parcel as the loading object is received together with the request of the vehicle loading determination. More specifically, the information includes the identification information of the request user, the identification information of the parcel, the information of the dimensions of the parcel, the information of the weight of the parcel, the information of whether "UPTURNING PROHIBITION" or "LOWER-LOADING PROHIBITION" is designated for the parcel, the information of the designation of the loading position of the parcel, and the information of the setting content of whether the layout change is possible. When the positive determination is made in S201, the process proceeds to S202, and when the negative determination is made, the process shown in FIG. 7 ends.

In S202, the loading determination unit 4022 executes the loading determination process shown in FIG. 6A and FIG. 6B. In S203, the loading determination unit 4022 determines whether the loading is possible as a result of the loading determination process in S202. When the positive determination is made in S203, the process proceeds to S204, and when the negative determination is made, the process proceeds to S205.

In S204, the loading determination unit 4022 transmits a notice that the loading is possible, to the pickup-delivery management server 500 or the user terminal 50 of the request user that is the request source. For example, notices of a loading position of the parcel as the object is given with the notice that the loading is possible. When there is a parcel to be moved, notices of the identification information of the parcel to be moved and the destination of the parcel are also given together with the notice that the loading is possible. Thereafter, the process shown in FIG. 7 ends.

In S205, the loading determination unit 4022 transmits a notice that the loading is impossible, to the pickup-delivery management server 500 or the user terminal 50 of the request user that is the request source. When the pickup-delivery management server 500 receives the notice that the loading is impossible, the pickup-delivery management server 500 gives a notice that the loading is impossible, to the user terminal 50 of the request user, for example. When the request user receives the notice that the loading is impossible, the request user can cope, for example, by changing the layout of the interior of the vehicle cabin or luggage compartment by oneself for creating a space in which the parcel can be loaded, or by changing the pickup-delivery place for the parcel to the user's home. After the process in S205, the process shown in FIG. 7 ends.

FIG. 8 is an exemplary flowchart of an issuance control process for the authentication information that is executed by the center server 400. For example, the process shown in FIG. 8 is executed repeatedly with a predetermined period.

In S301, the authentication information management unit 4021 determines whether the issuance request for the authentication information has been received. For example, the issuance request for the authentication information is received from the user terminal 200 of the pickup-delivery user through the pickup-delivery management server 500. For example, the identification information of the request user, the identification information of the parcel and the like are received together with the issuance request of the authentication information. When the positive determination is made in S301, the process proceeds to S302. When the negative determination is made in S301, the process shown in FIG. 8 ends.

In S302, the authentication information management unit 4021 issues the authentication information of the vehicle 10, to the user terminal 200 of the pickup-delivery user that is the request source. For example, the authentication information of the vehicle that is transmitted to the user terminal 200 of the pickup-delivery user is authentication information allowing the locking and unlocking of only the door corresponding to a loading region that is the object of the issuance request for the authentication information and that is the loading position of the parcel in the pickup-delivery. For example, when the loading position of the pickup-delivery parcel is the rear left seat, authentication information allowing only the rear left door to be locked and unlocked is issued. However, the disclosure is not limited to this, and authentication information allowing all doors of the vehicle 10 to be locked and unlocked may be transmitted. The authentication information of the vehicle 10 is acquired from the authentication information DB 404.

In S303, the authentication information management unit 4021 determines whether the pickup-delivery of the object of the issuance request for the authentication information is a delivery. For example, information of whether the pickup-delivery of the object of the issuance request for the authentication information is a delivery is included in the pickup-delivery information that is received from the pickup-delivery management server 500 together with the request of the vehicle loading determination, and the pickup-delivery information is saved in a storage unit (not illustrated) by the center server 400. When the pickup-delivery of the object of the issuance request for the authentication information is a pickup, the negative determination is made in S303. When the positive determination is made in S303, the process proceeds to S304, and when the negative determination is made, the process proceeds to S310.

The processes in S304 to S309 are processes when the pickup-delivery of the object of the issuance request for the authentication information is a delivery. In S304, for example, the authentication information management unit 4021 determines whether the request of the layout change has been received from the user terminal 200 of the pickup-delivery user through the pickup-delivery management server 500. The receiving of the request of the layout change from the user terminal 200 of the pickup-delivery user occurs, for example, when the pickup-delivery user inputs the request of the layout change to the user terminal 200 in the case where the delivery parcel cannot be loaded on the loading position because another parcel has been already loaded on the loading position of the vehicle 10, or in the case where the delivery parcel cannot be loaded on the loading position because the dimensions of the delivery parcel are larger than dimensions in the plan. When the positive determination is made in S304, the process proceeds to S305, and when the negative determination is made, the process proceeds to S309. For example, when the request of the layout change has not been received even if a predetermined time has elapsed, the negative determination is made in S304.

In S305, the authentication information management unit 4021 calls the vehicle loading determination process to the loading determination unit 4022, and the loading determination unit 4022 performs the vehicle loading determination process for the delivery parcel. The notice of the result of the vehicle loading determination process is given from the loading determination unit 4022 to the authentication information management unit 4021.

In S306, for the delivery parcel, the authentication information management unit 4021 determines whether the result of the vehicle loading determination process shows that the loading is possible. When the positive determination is made in S306, the process proceeds to S307, and when the negative determination is made, the process proceeds to S308.

In S307, since the result of the vehicle loading determination process for the delivery parcel shows that the loading is possible, the authentication information management unit 4021 gives a notice of loading position change for the delivery parcel, to the user terminal 200 of the pickup-delivery user. For example, a notice of a new loading position of the delivery parcel that is determined by the vehicle loading determination process in S305 is given together with the notice of the loading position change for the delivery parcel.

In S308, since the result of the vehicle loading determination process for the delivery parcel shows that the loading is impossible, the authentication information management unit 4021 gives a notice that the loading is impossible, to the user terminal 200 of the pickup-delivery user. In this case, for example, the pickup-delivery user goes back with the pickup-delivery parcel once, and performs the delivery again.

In S309, the authentication information management unit 4021 determines whether a loading completion notice has been received. The authentication information management unit 4021 determines that the loading completion notice has been received, for example, in the case where the pickup-delivery user inputs pickup-delivery completion to the user terminal 200, where a pickup-delivery completion notice has been received from the user terminal 200 through the pickup-delivery management server 500, and where the pickup-delivery of the object of the pickup-delivery completion notice is "DELIVERY". For example, the identification information of the request user and the identification information of the parcel are received together with the pickup-delivery completion notice. When the positive determination is made in S309, the process proceeds to S311. When the negative determination is made in S309, the process proceeds to S309 again. For example, when the receiving of the loading completion notice has not been detected even if a predetermined time has elapsed, the process may proceed to S311.

The process in S310 is a process when the pickup-delivery of the object of the issuance request for the authentication information is a pickup. In S310, the authentication information management unit 4021 determines whether a pickup completion notice has been received. The authentication information management unit 4021 determines that the pickup completion notice has been received, for example, in the case where the pickup-delivery user performs an operation of the pickup-delivery completion to the user terminal 200 and where the pickup-delivery completion notice has been received from the user terminal 200 through the pickup-delivery management server 500. When the positive determination is made in S310, the process proceeds to S311. When the negative determination is made in S310, the process proceeds to S310 again. For example, when the receiving of the pickup completion notice has not been detected even if a predetermined time has elapsed, the process may proceed to S311.

In S311, the authentication information management unit 4021 performs an invalidation process for the authentication information. The invalidation process for the authentication information is not limited to a particular content, as long as it is possible to prevent the pickup-delivery user from locking and unlocking the vehicle 10 with the authentication information already issued. Examples of the invalidation process are shown as follows. (1) The center server 400 instructs the user terminal 200 to delete the authentication information. (2) The center server 400 instructs the user terminal 200 to set an invalidation flag for the authentication information. In this case, the control unit 203 need be configured not to transmit the authentication information for which the invalidation flag is set, to the vehicle 10 by the short-range wireless communication. (3) The center server 400 instructs the user terminal 200 to alter the expiration date and time included in the authentication information to a past date and time. (4) The center server 400 instructs the user terminal 200 not to transmit the authentication information to the vehicle 10 because the authentication information is invalid. (5) The center server 400 instructs the key unit 100 not to accept the authentication information through the data communication device 350 because the authentication information is invalid. This instruction corresponds to the information relevant to the authentication process. (6) The center server 400 instructs the key unit 100 not to accept the authentication information from the user terminal 200. This instruction corresponds to the information relevant to the authentication process.

Each of the invalidation processes shown in the above (1) to (4) is a process that is performed to the user terminal 200 by the center server 400, and each of the invalidation processes shown in the above (5) to (6) is a process that is performed to the key unit 100 by the center server 400. The invalidation process may be one of the process that is performed to the user terminal 200 and the process that is performed to the key unit 100. However, preferably, both of them should be performed because the communication between the user terminal 200 and the center server 400 and the communication between the data communication device 350 and the center server 400 are not always good conditions.

After the invalidation process is performed in S311, a notice that the authentication information has been invalidated may be given to the user terminal 200 for which the authentication information has been invalidated. Thereafter, the process shown in FIG. 8 ends.

FIG. 9 is an exemplary flowchart of a loading arrangement process that is executed by the center server 400. In the loading arrangement process, after the loading in the vehicle 10 is completed, whether the parcel has been loaded on a planned loading position is checked. Then, for example, in the case where the parcel has been loaded on a position different from the planned loading position, or in the case where the size of the parcel is larger than the size in the plan although the parcel has been loaded on the planned loading position and the parcel is loaded beyond the loading region corresponding to the loading position so as to reach an adjacent loading region, the loading position of another parcel that is planned to be loaded is altered. For example, the process shown in FIG. 9 is executed repeatedly with a predetermined period.

In S401, the loading determination unit 4022 determines whether the loading completion notice has been received. For example, the loading completion notice is detected by a notice of delivery completion that is received by the center server 400 from the user terminal 200 through the pickup-delivery management server 500 when the pickup-delivery user who delivers the delivery parcel to the vehicle 10 loads the delivery parcel in the vehicle 10 and inputs the delivery completion to the user terminal 200 of the pickup-delivery user. Further, for example, the loading completion notice is transmitted from the user terminal 50 of the request user to the center server 400 when the request user who requests the vehicle loading determination to the center server 400 loads the parcel on the loading position of the vehicle 10 determined by the vehicle loading determination and inputs the loading completion to the user terminal 50 of the request user. For example, the identification information of the request user and the identification information of the parcel are transmitted together with the loading completion notice. When the positive determination is made in S401, the process proceeds to S402, and when the negative determination is made, the process shown in FIG. 9 ends.

In S402, the loading determination unit 4022 acquires the information relevant to the current state of the loading in the vehicle cabin and luggage compartment of the vehicle 10, and determines whether there is consistency with the vehicle loading information, for the parcel as the object of the loading completion notice. Hereinafter, the parcel as the object of the loading completion notice is referred to as the parcel as the object. Hereinafter, the information relevant to the current state of the loading in the vehicle cabin and luggage compartment of the vehicle 10 is referred to as loading current-state information.

For example, together with the loading completion notice, the loading current-state information may be input to the user terminal 200 of the pickup-delivery user or the user terminal 50 of the request user, and may be transmitted to the center server 400. Alternatively, the loading determination unit 4022 may request the acquisition of the capture image of the vehicle cabin and luggage compartment to the data communication device 350 of the vehicle 10, may acquire the capture image of the vehicle cabin and luggage compartment that is captured by the camera 390, from the data communication device 350, and may acquire the loading current-state information by analyzing the capture image.

For example, the loading current-state information includes the information relevant to the parcel and the loading region in which the parcel is loaded. For example, the information relevant to the parcel that is included in the loading current-state information is one or a combination of the identification information, dimensions, shape and others of the parcel.

Whether there is consistency between the loading current-state information and the vehicle loading information for the parcel as the object is determined, for example, based on whether the loading region in which the parcel as the object has been loaded and the order of the loading that are indicated by the loading current-state information coincide with the loading region corresponding to the parcel as the object and the order of the loading that are indicated by the vehicle loading information. For example, in the case where the parcel as the object has been loaded in an adjacent loading region beyond the loading region corresponding to the loading position, it is determined that the loading region in which the parcel as the object has been loaded (the loading region corresponding to the loading position and the adjacent loading region) and that is indicated by the loading current-state information does not coincide with the loading region that corresponds to the parcel as the object and that is indicated by the vehicle loading information. For example, in the case where another parcel is planned to be loaded in the loading region corresponding to the parcel as the object earlier than the parcel as the object in the vehicle loading information and where the parcel as the object, despite the plan, has been loaded in the loading region earlier, the loading region in which the parcel as the object has been loaded and that is indicated by the loading current-state information coincides with the loading region that corresponds to the parcel as the object and that is indicated by the vehicle loading information, but the order of the loading in the loading current-state information does not coincide with the order of the loading in the vehicle loading information. Therefore, it is determined that there is no consistency between the loading current-state information and the vehicle loading information. When the positive determination is made in S402, the process shown in FIG. 9 ends. When the negative determination is made in S402, the process proceeds to S403.

In S403, the loading determination unit 4022 determines whether there is a parcel planned to be loaded after this in the loading region in which the parcel as the object of the loading completion notice has been loaded and that is indicated by the loading current-state information. For example, this determination is performed based on the vehicle loading information table. When the positive determination is made in S403, the process proceeds to S404, and when the negative determination is made, the process shown in FIG. 9 ends.

In S404, the loading determination unit 4022 determines whether "LOWER-LOADING PROHIBITION" is designated for the parcel as the object. For example, the information of whether "LOWER-LOADING PROHIBITION" is designated for the parcel as the object is received by the center server 400, together with the request of the vehicle loading determination, and is saved (not illustrated). When the positive determination is made in S404, the parcel planned to be loaded cannot be loaded on the parcel as the object, and therefore, the process proceeds to S406. In S406, the vehicle loading determination process is performed for the parcel planned to be loaded, other than the loading region in which the parcel as the object has been loaded.

When the negative determination is made in S404, the process proceeds to S405. In S405, the loading determination unit 4022 determines whether, in the loading region in which the parcel as the object has been loaded, the parcel planned to be loaded in the loading region can be loaded on the parcel as the object. When the positive determination is made in S405, the loading-planned region for the parcel planned to be loaded is not changed, and therefore, the process shown in FIG. 9 ends. However, in this case, the order of the loading of the parcel planned to be loaded is changed, and therefore, the change is reflected in the vehicle loading information. When the negative determination is made in S405, it is necessary to change the loading-planned region for the parcel planned to be loaded. Therefore, the process proceeds to S406, and the vehicle loading determination process is performed for the parcel planned to be loaded, other than the loading region in which the parcel as the object has been loaded.

In S407, the loading determination unit 4022 determines whether the result of the vehicle loading determination process for the parcel planned to be loaded shows that the loading is possible. When the positive determination is made in S407, the process proceeds to S408, and when the negative determination is made, the process proceeds to S409.

In S408, since the result of the vehicle loading determination process for the parcel planned to be loaded shows that the loading is possible, the loading determination unit 4022 gives a notice of loading position change for the parcel planned to be loaded, to the user terminal 200 of the pickup-delivery user or the user terminal 50 of the request user, through the pickup-delivery management server 500 that serves for the delivery of the parcel planned to be loaded. For example, a notice of a new loading position for the parcel planned to be loaded, which is determined by the vehicle loading determination process in S406, is given together with the notice of the loading position change. Thereafter, the process shown in FIG. 9 ends.

In S409, since the result of the vehicle loading determination process for the parcel planned to be loaded shows that the loading is impossible, the loading determination unit 4022 gives a notice that the loading is impossible, to the user terminal 200 of the pickup-delivery user or the user terminal 50 of the request user, through the pickup-delivery management server 500 that serves for the delivery of the parcel planned to be loaded. Thereafter, the process shown in FIG. 9 ends.

Figure 10:
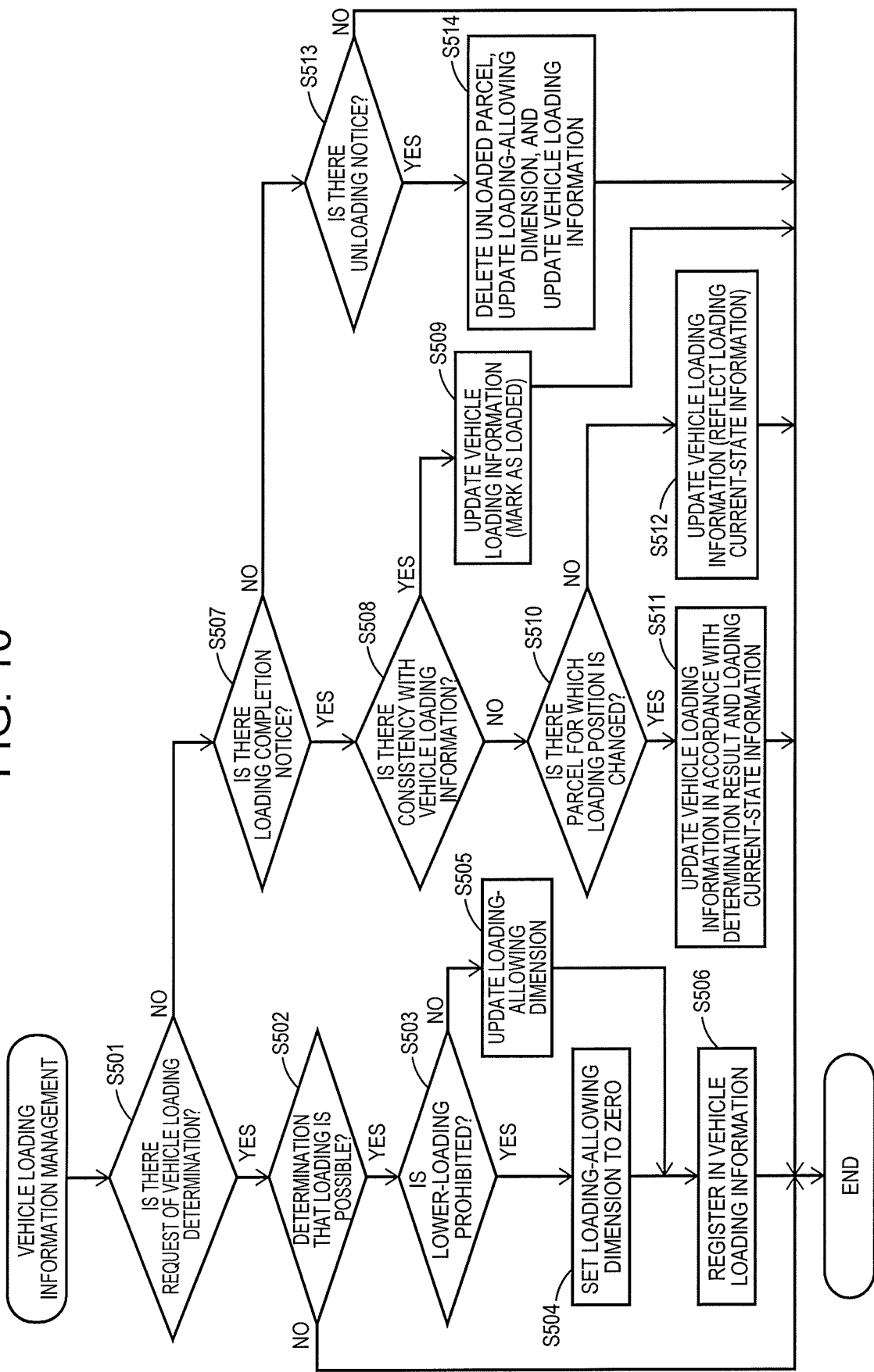
FIG. 10 is an exemplary flowchart of a management process for the vehicle loading information that is executed by the center server.

FIG. 10 is an exemplary flowchart of a management process for the vehicle loading information that is executed by the center server 400. Specifically, the management process for the vehicle loading information is a process for controlling the loading-allowing dimension. For example, the control of the loading-allowing dimension is performed when a loading-planned position of the parcel is decided by the vehicle loading determination process, when the loading completion notice is received, or when an unloading notice is received. For example, the process shown in FIG. 10 is executed repeatedly with a predetermined period.

In S501, the loading information management unit 4023 determines whether the request of the vehicle loading determination has been received. When the positive determination is made in S501, the process proceeds to S502, and when the negative determination is made, the process proceeds to S506.

Processes in S502 to S506 are processes when the request of the vehicle loading determination has been received. In S502, the loading information management unit 4023 determines whether the determination that the loading is possible has been made as a result of the vehicle loading determination process by the loading determination unit 4022. When the positive determination is made in S502, the process proceeds to S503. When the negative determination is made in S502, since there is no parcel that is planned to be newly loaded and the loading-allowing dimensions of each loading region are not changed, the process shown in FIG. 10 ends.

In S503, the loading information management unit 4023 determines whether the parcel as the object of the vehicle loading determination process is a parcel for which "LOWER-LOADING PROHIBITION" is designated. When the positive determination is made in S503, the process proceeds to S504, and when the negative determination is made, the process proceeds to S505.

In S504, since "LOWER-LOADING PROHIBITION" is designated for the parcel as the object of the vehicle loading determination process, the loading information management unit 4023 sets zero as the values of the loading-allowing dimension field of the record of the loading region that is in the vehicle loading determination table and that is determined as the loading position of the parcel. Thereby, it is shown that there is no space in the loading region determined as the loading position of the parcel, and hereafter, it is possible to avoid another parcel from being loaded in the loading region.

In S505, since "LOWER-LOADING PROHIBITION" is not designated for the parcel as the object of the vehicle loading determination process, the loading information management unit 4023, for example, sets values resulting from subtracting the dimensions of the parcel, as the values of the loading-allowing dimension field of the record of the loading region that is in the vehicle loading determination table and that is determined as the loading position of the parcel.

In S506, the loading information management unit 4023 registers the identification information of the parcel as the object of the vehicle loading determination process, in the loading parcel ID field of the record of the loading-planned region of the parcel in the vehicle loading determination table. Thereafter, the process shown in FIG. 10 ends.

In S507, the loading information management unit 4023 determines whether the loading completion notice has been received. When the positive determination is made in S507, the process proceeds to S508, and when the negative determination is made, the process proceeds to S513.

Processes in S508 to S512 are processes when the loading completion notice has been received. In S508, the loading information management unit 4023 determines whether there is consistency between the loading current-state information and the vehicle loading information. In this determination, for example, the result of the determination that is performed by the loading determination unit 4022 in S402 of FIG. 9 may be used. When the positive determination is made in S508, the process proceeds to S509, and when the negative determination is made, the process proceeds to S510.

In S509, since there is consistency between the loading current-state information and the vehicle loading information, that is, since the parcel has been loaded on a planned loading position, the loading information management unit 4023 places a mark indicating that the parcel has been loaded, on a record in the vehicle loading information in which the parcel as the object of the loading completion notice is registered. Thereafter, the process shown in FIG. 10 ends.

In S510, since there is not consistency between the loading current-state information and the vehicle loading information, that is, since the parcel has been loaded in a loading region different from the planned loading position, the loading information management unit 4023 determines whether there is a parcel that is planned to be loaded and for which the loading position is changed as a result of the vehicle loading determination process (S406 in FIG. 9) by the loading determination unit 4022. When the positive determination is made in S510, the process proceeds to S511, and when the negative determination is made, the process proceeds to S512.

In S511, since there is a parcel that is planned to be loaded and for which the loading position is changed, the loading information management unit 4023 updates the vehicle loading information in accordance with the result of the vehicle loading determination process by the loading determination unit 4022 and the loading current-state information. For example, in the case where the loading position of a parcel A planned to be loaded is changed from the assistant driver's seat to the rear left seat, the loading determination unit 4022, in the update, adds the values of the dimensions of the parcel A to the values of the loading-allowing dimension field in the record of the assistant driver's seat in the vehicle loading information table, and subtracts the values of the dimensions of the parcel A from the values of the loading-allowing dimension field in the record of the rear left seat. Further, at this time, the loading determination unit 4022 registers the information about the parcel as the object of the loading completion notice, in a record of the vehicle loading information table. The record of the vehicle loading information table is the record of a loading region that corresponds to the loading position of the parcel as the object of the loading completion notice and that is indicated by the loading current-state information. Thereafter, the process shown in FIG. 10 ends.

In S512, since there is no parcel that is planned to be loaded and for which the loading position is changed, the loading information management unit 4023 updates the vehicle loading information in accordance with the loading current-state information.

In the update of the vehicle loading information in S511 and S512, the loading information management unit 4023 sets zero as the values of the loading-allowing dimension field of the loading region in which the parcel has been loaded, when "LOWER-LOADING PROHIBITION" is designated for the parcel as the object of the loading completion notice. Thereafter, the process shown in FIG. 10 ends.

In S513, the loading information management unit 4023 determines whether the unloading notice has been received. The loading information management unit 4023 determines that the unloading notice has been received, for example, in the case where the pickup-delivery user inputs the pickup-delivery completion to the user terminal 200, where the pickup-delivery completion notice has been received from the user terminal 200 through the pickup-delivery management server 500 and where the pickup-delivery of the object of the pickup-delivery completion notice is "DELIVERY", or in the case where the request user inputs the unloading completion to the user terminal 50 and where the unloading notice has been received from the user terminal 50 to the center server 400. For example, the identification information of the request user and the identification information of the parcel are received, together with the unloading notice. When the positive determination is made in S513, the process proceeds to S514. When the negative determination is made in S513, the process shown in FIG. 10 ends.

In S514, the loading information management unit 4023 updates the vehicle loading information by deleting the parcel as the object of the unloading notice from the vehicle loading information and adding the dimensions of the parcel to the values of the loading-allowing dimension field of the loading region in which the parcel has been loaded. Thereafter, the process shown in FIG. 10 ends.

The flowcharts shown in FIG. 6A, FIG. 6B, FIG. 7, FIG. 8, FIG. 9 and FIG. 10 are examples, and are not limited to the respectively shown processes. For example, in FIG. 10, after the receiving of the loading completion notice and the check of the consistency with the vehicle loading information (FIG. 10, S508), the vehicle loading information may be updated based on the loading current-state information, and the vehicle loading determination process in S406 of FIG. 9 may be performed based on the vehicle loading information after the update. For example, in the case where "LOWER-LOADING PROHIBITION" is designated for the parcel as the process object in FIG. 9 (the parcel as the object of the loading completion notice), the loading-allowing dimensions of the loading region in which the parcel as the process object has been loaded are set to zero. Thereby, the loading region in which the parcel as the process object has been loaded is excluded from the object of the vehicle loading determination process for the parcel planned to be loaded in the loading region.

Specific Example

Figure 11A:
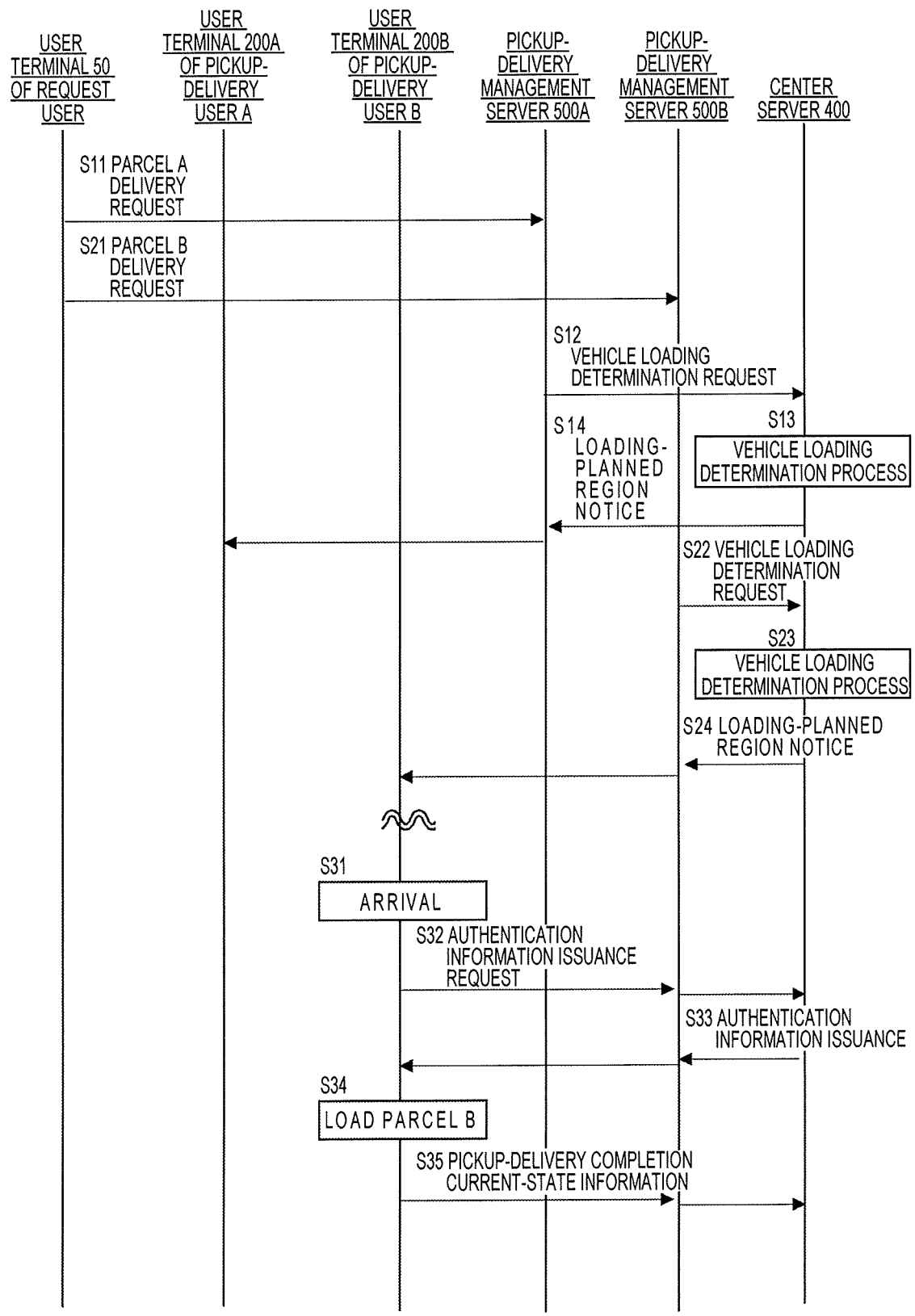
FIG. 11A is a diagram showing an exemplary process sequence of a delivery of a parcel to a vehicle using a service with the trunk sharing system in a specific example.

Each of FIG. 11A and FIG. 11B is a diagram showing an exemplary process sequence of a delivery of a parcel to a vehicle using a service with the trunk sharing system 1 in a specific example. In the specific example, a case where the request user requests the delivery of a parcel A and a parcel B using an application for using the service with the trunk sharing system 1 will be described.

In S11 and S21, the request user requests a delivery business operator A and a delivery business operator B to deliver the parcel A and the parcel B, respectively, so that pickup-delivery requests are transmitted from the user terminal 50 of the request user to the pickup-delivery management server 500A and the pickup-delivery management server 500B. Hereinafter, characters A, B are put to the reference numerals of pickup-delivery management servers, pickup-delivery users and user terminals that are managed by the delivery business operators A, B, respectively.

For the parcel A, the request user designates a loading region on the left side in the trunk room, as the loading position. For the parcel B, the request user does not perform the designation of the loading position. Further, each of the pickup-delivery management servers 500A, 500B is notified that the parcel A and the parcel B have the same size and the size is a size allowing the loading in the loading region on the left side in the trunk room. In the initial state, there is no parcel in the trunk room of the vehicle 10. The designation of the delivery date and time is not performed for either of the parcel A and the parcel B.

In S12 and S22, the pickup-delivery management server 500A and the pickup-delivery management server 500B respectively transmit the request of the vehicle loading determination for the parcel A and the request of the vehicle loading determination for the parcel B, to the center server 400. In S13, S23, the center server 400 receives the requests of the vehicle loading determination (FIG. 7, S201: YES), and performs the vehicle loading determination process for the parcel A and the parcel B (FIG. 7, S202). In S14 and S24, the center server 400 gives notices of the loading positions of the parcel A and the parcel B, to the pickup-delivery management server 500A and the pickup-delivery management server 500B, and thereafter, the pickup-delivery management server 500A and the pickup-delivery management server 500B give a notice of the loading positions of the parcel A and the parcel B, to the user terminal 200A of the pickup-delivery user A and the user terminal 200B of the pickup-delivery user B (FIG. 7, S204).

FIG. 12 is a diagram showing an exemplary plan of the loading positions of the parcel A and the parcel B in the specific example. FIG. 12 is an example of the result of the vehicle loading determination process performed in S13 and S23 of FIG. 11A.

For the parcel A, the loading region on the left side in the trunk room is designated as the loading position (FIG. 6A, S103: YES), and in the initial state, there is no parcel in the loading region on the left side in the trunk room (FIG. 6B, S120: YES). Therefore, it is determined that the loading position is the loading region on the left side in the trunk room. For the parcel B, suppose that it is determined that the loading position is the middle of the trunk room, which is one of the spaces in the vehicle 10 (FIG. 6A, S103 NO, S104: YES, S105).

In the vehicle loading information in the center server 400, the parcel A is associated with the loading region on the left side in the trunk room. The parcel B is associated with the loading region in the middle of the trunk room (FIG. 10, S501: YES, S502: YES, S503: NO, S505).

Back to FIG. 11A, in S31, the pickup-delivery user B arrives at the vehicle 10 earlier. In S32, the user terminal 200B of the pickup-delivery user B transmits the issuance request for the authentication information to the center server 400 through the pickup-delivery management server 500B. In S33, the center server 400 receives the issuance request for the authentication information (FIG. 8, S301: YES), and issues the authentication information allowing the locking and unlocking of only the door of the trunk room that is the loading position of the parcel B (FIG. 8, S302).

In S34, the pickup-delivery user B unlocks the door of the trunk room, using the authentication information issued from the center server 400, and loads the parcel B in the middle of the trunk room that is the loading position of the parcel B. On this occasion, suppose that the size of the parcel B is larger than the size in the plan and the parcel B is loaded beyond the loading region in the middle of the trunk room so as to reach the loading regions on the left side and right side in the trunk room, that is, the parcel B is loaded over the whole of the trunk room. Further, suppose that there is no space in which the parcel A can be loaded in the whole of the trunk room.

In S35, the pickup-delivery user B inputs the pickup-delivery completion to the user terminal 200B. Then, the pickup-delivery completion notice is transmitted from the user terminal 200B to the center server 400 through the pickup-delivery management server 500B. Together with the pickup-delivery completion notice, the pickup-delivery user B, to the user terminal 200B, inputs the information of the dimensions of the parcel B and inputs the whole of the trunk room as the loading position in which the parcel B has been loaded. Then, a notice of the information, as the loading current-state information, is given to the center server 400, together with the pickup-delivery completion notice.

In S41 of FIG. 11B, the center server 400 receives the pickup-delivery completion notice and the loading current-state information from the user terminal 200B of the pickup-delivery user B (FIG. 8, S309: YES, FIG. 9, S401: YES). Since the loading region that corresponds to the parcel B and that is indicated by the vehicle loading information is the region in the middle of the trunk room while the loading region in which the parcel B has been loaded and that is indicated by the loading current-state information is the whole of the trunk room, the center server 400 detects the inconsistency between the vehicle loading information and the loading current-state information, for the parcel B (FIG. 9, S402: NO, FIG. 10, S508: NO).

In S42, since the parcel A is planned to be loaded in the region on the left side in the trunk room, which is one of the regions occupied by the parcel B, but there is no space in which the parcel A can be loaded in the region on the left side in the trunk room (FIG. 9, S403, S404: NO, S405: NO), the center server 400 executes the vehicle loading determination process for the parcel A (FIG. 9, S406). Suppose that it is decided that the new loading-planned region of the parcel A is the rear left seat (FIG. 6B, S121: YES, S122).

In S43, the center server 400 transmits the inquiry of the permission of the layout change, to the user terminal 50 of the request user (FIG. 6B, S126). The inquiry is needed because the parcel A cannot be loaded in the designated loading region, and is an inquiry of the permission of the change in the loading position of the parcel A. In S44, the request user inputs the permission of the layout change to the user terminal 50, and the user terminal 50 of the request user transmits the notice of the permission of the layout change, to the center server 400. The processes in S43 and S44 are performed through the pickup-delivery management server 500A.

In S45, since the permission of the layout change has been received from the request user (FIG. 6B, S127: YES), the center server 400 transmits the notice of the loading position change for the parcel A, to the user terminal 200A of the pickup-delivery user A through the pickup-delivery management server 500A (FIG. 9, S408). On this occasion, the center server 400 updates the vehicle loading information such that the parcel B (loaded) is associated with the loading regions in the whole of the trunk room and the parcel A is associated with the loading region on the rear left seat (FIG. 10, S510: YES, S511).

In S51, the pickup-delivery user A arrives at the vehicle 10. In S52, the user terminal 200A of the pickup-delivery user A transmits the issuance request for the authentication information, to the center server 400 through the pickup-delivery management server 500A. In S53, the center server 400 receives the issuance request for the authentication information (FIG. 8, S301: YES), and issues the authentication information allowing the locking and unlocking of only the rear left door of the vehicle cabin that corresponds to the rear left seat as the delivery position of the parcel A (FIG. 8, S302).

In S54, the pickup-delivery user A unlocks the rear left door of the vehicle cabin, using the authentication information issued from the center server 400, and loads the parcel A on the rear left seat as the delivery position of the parcel A. In S55, the pickup-delivery user A inputs the pickup-delivery completion to the user terminal 200A. Then, the pickup-delivery completion notice is transmitted from the user terminal 200A to the center server 400 through the pickup-delivery management server 500A. Together with the pickup-delivery completion notice, the pickup-delivery user A inputs the rear left seat to the user terminal 200A, as the loading region in which the parcel A has been loaded. Then, a notice of the information, as the loading current-state information, is given to the center server 400, together with the pickup-delivery completion notice.

In S56, the center server 400 receives the pickup-delivery completion notice and the loading current-state information from the user terminal 200A of the pickup-delivery user A (FIG. 8, S309: YES, FIG. 9, S401: YES). Since the loading region that corresponds to the parcel A and that is indicated by the vehicle loading information is the region on the rear left seat and the loading region in which the parcel A has been loaded and that is indicated by the loading current-state information is also the region on the rear left seat, the center server 400 detects the consistency between the vehicle loading information and the loading current-state information, for the parcel A (FIG. 9, S402: YES, FIG. 10, S508: YES). On this occasion, the center server 400 updates the vehicle loading information by placing a mark indicating that the parcel has been loaded, for the parcel A associated with the loading region on the rear left seat (FIG. 10, S509). Thereby, the delivery of the parcel A and the parcel B to the vehicle 10 finishes.

FIG. 13 is a diagram showing an exemplary loading state in the trunk room after the loading of the parcel A and the parcel B is completed in the specific example. The parcel A is loaded on the rear left seat, which is different from the initially planned position shown in FIG. 12. The parcel B is loaded on the initially planned position shown in FIG. 12, but is loaded over the whole of the trunk room because of a size larger than the size in the initial plan.

As another specific example, suppose that the parcel B is loaded on the rear left seat earlier than the parcel A, for example, in the case where the parcel A and the parcel B are planned to be loaded on the rear left seat in this order and the lower-loading prohibition is designated for the parcel B in the vehicle loading information. In this case, although the vehicle loading information does not include the information that the parcel A has loaded, the loading current-state information indicates that the parcel B has been loaded, and therefore, the inconsistency between the vehicle loading information and the loading current-state information is detected (FIG. 9, S402: NO, FIG. 10, S508: NO). Since the lower-loading prohibition is designated for the parcel B as the object parcel (FIG. 9, S403: YES, S404: YES), the vehicle loading determination process for the parcel A is performed other than the rear left seat (FIG. 9, S406). For example, it is determined that the new loading position of the parcel A is the rear right seat, and a notice of the new loading position is given to the user terminal 200A of the pickup-delivery user A (FIG. 9, S408). Further, the vehicle loading information is updated such that a mark indicating that the parcel has been loaded is placed for the parcel B associated with the loading region on the rear left seat and the parcel A is associated with the loading region on the rear right seat (FIG. 10, S510: YES, S511).

As another specific example, suppose that the parcel B is loaded on the rear left seat earlier than the parcel A, for example, in the case where the parcel A and the parcel B are planned to be loaded on the rear left seat in this order and the lower-loading prohibition is not designated for either of the parcel A and the parcel B in the vehicle loading information. In this case, although the vehicle loading information does not include the information that the parcel A has been loaded, the loading current-state information indicates that the parcel B has been loaded, and therefore, the inconsistency between the vehicle loading information and the loading current-state information is detected (FIG. 9, S402: NO, FIG. 10, S508: NO). Since the lower-loading prohibition is designated for the parcel B as the object parcel and the parcel A can be loaded on the parcel B (FIG. 9, S403: YES, S404: NO, S405: YES), the loading position of the parcel A is the rear left seat, with no change. The vehicle loading information is updated such that the loading order of the parcel A and parcel B associated with the loading region on the rear left seat is changed and a mark indicating that the parcel has been loaded is placed for the parcel B (FIG. 10, S510: NO, S512).

Function Effect of First Embodiment

In the first embodiment, the center server 400 has the information of the dimensions (loading-allowing dimensions) allowing the loading for each loading region in the vehicle 10, and determines whether the parcel can be loaded in the vehicle 10 and the loading position of the parcel, based on the loading-allowing dimensions for each loading region. Thereby, when the parcel is loaded in the vehicle 10, by the inquiry to the center server 400, it is possible to know whether the parcel can be loaded and the loading position of the parcel, before loading work is actually performed, and it is possible to improve efficiency of the work of the loading of the parcel in the vehicle 10.

In the first embodiment, in the case where the vehicle 10 has no loading region in which the parcel as the object of the vehicle loading determination process can be loaded, the center server 400 determines whether the parcel as the object can be loaded by the movement of the loaded parcel. Thereby, it is possible to use the loading region in the vehicle 10 more efficiently.

In the first embodiment, the center server 400 manages the loading state of the parcel in the vehicle 10, as the vehicle loading information, and checks whether the parcel has been loaded on an initially planned loading position. In the case where the parcel has been loaded on a position different from the initially planned loading position, the center server 400 determines again whether the parcel can be loaded and the loading position, for a parcel that is planned to be thereafter loaded in the loading region in which the parcel has been loaded. Thereby, for example, in the case where a plurality of pickup-delivery users loads parcels in the vehicle 10, it is possible to flexibly respond even if the loading plan is upset.

In the first embodiment, to the pickup-delivery user, the center server 400 issues the authentication information allowing the locking and unlocking of only the door corresponding to the loading position of the pickup-delivery parcel. Thereby, it is possible to restrain the pickup-delivery user from accessing a region other than the loading region corresponding to the loading position of the pickup-delivery parcel, and it is possible to ensure the security of the vehicle 10.

In the first embodiment, the center server 400 intensively manages the loading situation of parcels in the vehicle 10 by a plurality of business operators. Thereby, it is possible to enhance the security of the loading information of the vehicle 10, by the unified management of the loading state of the parcel in the vehicle 10.

Others

In the first embodiment, the camera 390 is mounted on the vehicle 10, and the center server 400 uses the image captured by the camera 390 as one of the means for acquiring the loading situation (loading current-state information) of the parcel in the vehicle cabin and luggage compartment of the vehicle 10. However, the means for acquiring the loading current-state information is not limited to the camera 390. For example, the vehicle 10 may include and use an infrared sensor, an ultrasonic sensor or a laser sensor, as the means for acquiring the loading current-state information. Alternatively, a capture image of the interior of the vehicle cabin or luggage compartment of the vehicle 10 that is captured by a camera equipped in the user terminal 50 of the request user or the user terminal 200 of the pickup-delivery user may be transmitted from the user terminal 50 or the user terminal 200, and the loading current-state information may be acquired by analyzing the capture image.

In the first embodiment, the loading position of the parcel is decided in the vehicle loading determination process, such that priority is given to loading regions having spaces (for example, S103 to S105 of FIG. 6A, S121 to S122 of FIG. 6B). However, the disclosure is not limited to this. For example, a loading region satisfying a predetermined condition may be selected as the loading position of the parcel as the object, regardless of whether there is a loaded parcel, and when there is a loaded parcel in the selected region, a region to which the parcel is moved may be determined.

In the first embodiment, whether the parcel can be loaded in the vehicle 10 is determined based on the dimensions of the parcel. However, the determination standard of whether the parcel can be loaded in the vehicle 10 is not limited to the dimensions of the parcel. For example, the weight of the parcel or the height of the loaded parcel may be used. Specifically, a limit of the weight of the parcel may be set for each loading region, and the parcel may be prevented from being loaded over the weight limit. By setting the weight limit, it is possible to avoid decrease in fuel efficiency when the vehicle 10 travels while the parcel is loaded. Further, for example, a limit of the height of the loaded parcel may be provided for each loading region, and the parcel may be prevented from being loaded over the height limit. By setting the limit of the height of the loaded parcel, it is possible to keep rearward visibility and lateral visibility when the vehicle 10 travels while the parcel is loaded.

In the first embodiment, the vehicle loading determination process is used for deciding the loading position of the parcel when the vehicle 10 is used as an acceptance place for the parcel. However, the application of the vehicle loading determination process is not limited to this. For example, the vehicle loading determination process can be applied to a system that automatically changes the layout of the parcels loaded in the vehicle 10.

In the first embodiment, when the layout change is previously set, whether the layout change is permitted is decided for the whole of the vehicle 10. However, the disclosure is not limited to this. For example, the disclosure may be configured such that whether layout change is permitted can be set for each loading region. Thereby, it is possible to avoid the pickup-delivery user from touching a parcel already loaded in the vehicle 10.

Recording Medium

A program that realizes the above issuance control in a computer, a machine or a device (hereinafter, referred to as a computer or the like) can be recorded in a recording medium that is readable by the computer or the like. The computer or the like reads and executes the program in the recording medium, and thereby, the computer or the like functions as the center server 400.

Here, the recording medium that is readable by the computer or the like is a non-transitory recording medium that stores therein information such as data or a program by electric, magnetic, optical, mechanical or chemical action and that allows the computer or the like to read the information. As recording media that are removable from the computer or the like, there are a flexible disc, a magneto-optical disk, a CD-ROM, a CD-R/W, a DVD, a Blu-ray disc, a DAT, an 8-mm tape, a memory card such as a flash memory, and the like. Further, as recording media that are fixed in the computer or the like, there are a hard disk, a read only memory (ROM) and the like. Furthermore, a solid state drive (SSD) can be used as a recording medium that is removable from the computer or the like, and can be used as a recording medium that is fixed in the computer or the like.

What is claimed is:

1. A loading determination system comprising:
    a storage unit configured to store dimension information for each of a plurality of loading regions which is present in a vehicle, the dimension information being relevant to an upper limit of a dimension of a parcel which is able to be loaded in each of the loading regions; and
    a control unit configured to
        determine, based on the dimension information, whether a first parcel, which is planned to be loaded, is able to be loaded in the vehicle,
        output
            a determination result of whether the first parcel is able to be loaded, and
            when the first parcel is able to be loaded, first information relevant to a first loading region in which the first parcel is planned to be loaded, the first loading region being included in the plurality of loading regions,
        determine, when another parcel has been loaded in the first loading region, whether a second loading region in which the other parcel is able to be loaded is present, the second loading region being included in the plurality of loading regions and being a region in which no parcel different from the other parcel has been loaded; and
        output, when the second loading region is present, second information relevant to the second loading region, the second information including a notice that prompts movement of the other parcel to the second loading region.

2. The loading determination system according to claim 1, wherein the upper limit of the dimension of the parcel which is able to be loaded in the first loading region is larger than a dimension of the first parcel.

3. The loading determination system according to claim 1, wherein
    the upper limit of the dimension of the parcel which is able to be loaded in the second loading region is larger than a dimension of the other parcel, and
    the second loading region is different from the first loading region.

4. The loading determination system according to claim 1, wherein:
    the control unit is configured to determine whether the other parcel has been loaded in the first loading region; and the first information includes information indicating whether the other parcel has been loaded in the first loading region.

5. The loading determination system according to claim 1, wherein the control unit is configured to:
   transmit, when a first user who requests loading is different from a second user who performs loading and the second loading region is present, a request to a user terminal of the first user, the request requesting permission of movement of the other parcel to the second loading region; and
   transmit a notice to a user terminal of the second user, when a permission response to the request is received from the user terminal of the first user, the notice being a notice that prompts movement of the other parcel to the second loading region.

6. The loading determination system according to claim 1, wherein the control is unit configured to:
   update, after it is determined that the first parcel has been loaded in the first loading region and when lower loading of the first parcel is not prohibited, a value of the upper limit of the dimension included in the dimension information of the first loading region to a value resulting from subtracting at least a value of the dimension of the first parcel from a stored value; and
   set, when the lower loading of the first parcel is prohibited, the dimension information of the first loading region to a value indicating that another parcel is not able to be loaded in the first loading region.

7. The loading determination system according to claim 1, wherein the control unit is configured to determine, when the first parcel has been loaded in a third loading region, whether a loading region in which a second parcel different from the first parcel is able to be loaded is present, the first parcel being planned to be loaded in the first loading region and the third loading region being a region in which the second parcel is planned to be loaded.

8. The loading determination system according to claim 1, wherein the control unit is configured to determine, when the first parcel and a third parcel are planned to be loaded in the first loading region, the first parcel is loaded earlier than the third parcel, and lower loading of the first parcel is prohibited, whether a loading region in which the third parcel different from the first parcel is able to be loaded is present other than the first loading region.

9. The loading determination system according to claim 1, wherein the control unit is configured to cause only a door corresponding to the first loading region to be locked and unlocked when the first parcel is able to be loaded.

10. The loading determination system according to claim 1, wherein the control unit is configured to:
    determine, when a first user who requests loading designates a loading region for the first parcel, whether the first parcel is able to be loaded in the designated loading region; and
    give a notice of a determination result of whether the first parcel is able to be loaded in the designated loading region to a user terminal of the first user.

11. The loading determination system according to claim 10, wherein the control unit is configured to:
    determine, when the first parcel is not able to be loaded in the designated loading region, whether another loading region in which the first parcel is able to be loaded is present; and
    transmit, when the other loading region is present, a notice to the user terminal of the first user, a notice prompting change of the loading region for the first parcel to the other loading region.

12. A loading determination method comprising:
    causing, by a processor, a storing unit to store dimension information for each of a plurality of loading regions which is present in a vehicle, the dimension information being relevant to an upper limit of a dimension of a parcel which is able to be loaded in each of the loading regions;
    determining, by the processor, based on the dimension information, whether a first parcel which is planned to be loaded is able to be loaded in the vehicle;
    when the first parcel is able to be loaded, outputting, by the processor,
        a determination result of whether the first parcel is able to be loaded, and
        first information relevant to a first loading region in which the first parcel is planned to be loaded, the first loading region being included in the plurality of loading regions;
    determining, by the processor and when another parcel has been loaded in the first loading region, whether a second loading region in which the other parcel is able to be loaded is present, the second loading region being included in the plurality of loading regions and being a region in which no parcel different from the other parcel has been loaded; and
    outputting, by the processor and when the second loading region is present, second information relevant to the second loading region, the second information including a notice that prompts movement of the other parcel to the second loading region.

13. The loading determination method according to claim 12, further comprising causing, by the processor, only a door corresponding to the first loading region to be locked and unlocked when the first parcel is able to be loaded.

14. A system comprising:
    a memory circuitry configured to store dimension information for each of a plurality of loading regions which is present in a vehicle, the dimension information being relevant to an upper limit of a dimension of a parcel which is able to be loaded in each of the loading regions; and
    control circuitry configured to
        determine, based on the dimension information, whether a first parcel, which is planned to be loaded, is able to be loaded in the vehicle,
        output
            a determination result of whether the first parcel is able to be loaded, and
            when the first parcel is able to be loaded, first information relevant to a first loading region in which the first parcel is planned to be loaded, the first loading region being included in the plurality of loading regions,
        determine, when another parcel has been loaded in the first loading region, whether a second loading region in which the other parcel is able to be loaded is present, the second loading region being included in the plurality of loading regions and being a region in which no parcel different from the other parcel has been loaded; and
        output, when the second loading region is present, second information relevant to the second loading region, the second information including a notice that prompts movement of the other parcel to the second loading region.

15. The system according to claim 14, wherein the control circuitry is configured to cause only a door corresponding to the first loading region to be locked and unlocked when the first parcel is able to be loaded.

* * * * *